US012688250B2

(12) United States Patent (10) Patent No.: US 12,688,250 B2
Billingsley et al. (45) Date of Patent: Jul. 21, 2026

(54) ECONOMIC OPTIMIZATION FOR PRODUCT SEARCH RELEVANCY

(71) Applicant: PAYPAL, INC., San Jose, CA (US)

(72) Inventors: Eric Noel Billingsley, Campbell, CA (US); Raghav Gupta, Sunnyvale, CA (US); Randall Scott Shoup, San Francisco, CA (US); Neelakantan Sundaresan, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/322,021

(22) Filed: May 23, 2023

(65) Prior Publication Data

US 2023/0306072 A1 Sep. 28, 2023

Related U.S. Application Data

(63) Continuation of application No. 17/461,707, filed on Aug. 30, 2021, now Pat. No. 11,709,908, which is a
(Continued)

(51) Int. Cl.
G06F 16/958 (2019.01)
G06F 16/957 (2019.01)
(Continued)

(52) U.S. Cl.
CPC ........ G06F 16/958 (2019.01); G06F 16/9577 (2019.01); G06N 5/022 (2013.01);
(Continued)

(58) Field of Classification Search
CPC .............. G06F 16/9577; G06F 16/958; G06Q 10/06375; G06Q 30/02; G06Q 40/06; G06N 20/00; G06N 5/022
(Continued)

(56) References Cited

U.S. PATENT DOCUMENTS 5,535,382 A 7/1996 Ogawa
5,572,643 A 11/1996 Judson
(Continued)

FOREIGN PATENT DOCUMENTS

GB 2366033 A 2/2002
GB 2377773 A 1/2003
WO 2009002549 A1 12/2008

OTHER PUBLICATIONS

Bolin M, Webber M, Rha P, Wilson T, Miller RC. Automation and customization of rendered web pages. In Proceedings of the 18th annual ACM symposium on User interface software and technology Oct. 23, 2005 (pp. 163-172). (Year: 2005).*
(Continued)

*Primary Examiner* — Sara C Hamilton
(74) *Attorney, Agent, or Firm* — Kowert, Hood, Munyon, Rankin & Goetzel, P.C.; Catherine L. Gerhardt; Dean M. Munyon

(57) ABSTRACT

In one embodiment, a method is illustrated as including defining a set of perspective objects capable of being placed onto a modified web page, monitoring parameters of a web page, the parameters including a number of times a current object is executed on the web page, using an Artificial Intelligence (AI) algorithm to determine a perspective object with a preferred Return On Investment (ROI), and selecting the perspective object to be placed onto the modified web page.

20 Claims, 17 Drawing Sheets

Related U.S. Application Data continuation of application No. 16/590,337, filed on Oct. 1, 2019, now Pat. No. 11,120,098, which is a continuation of application No. 14/987,689, filed on Jan. 4, 2016, now Pat. No. 10,430,724, which is a continuation of application No. 11/821,928, filed on Jun. 26, 2007, now abandoned.

(51) Int. Cl.

| | | |
|---|---|---|
| *G06N 5/022* | (2023.01) | |
| *G06N 20/00* | (2019.01) | |
| *G06Q 10/0637* | (2023.01) | |
| *G06Q 30/02* | (2023.01) | |
| *G06Q 40/06* | (2012.01) | |

(52) U.S. Cl.
CPC ....... *G06N 20/00* (2019.01); *G06Q 10/06375* (2013.01); *G06Q 30/02* (2013.01); *G06Q 40/06* (2013.01)

(58) Field of Classification Search
USPC .......................................................... 706/12
See application file for complete search history.

(56) References Cited

U.S. PATENT DOCUMENTS

| | | | |
|---|---|---|---|
| 5,778,363 A | 7/1998 | Light | |
| 5,873,001 A | 2/1999 | Brinker et al. | |
| 5,963,910 A | 10/1999 | Ulwick | |
| 5,968,125 A | 10/1999 | Garrick et al. | |
| 6,185,614 B1 | 2/2001 | Cuomo et al. | |
| 6,185,616 B1 | 2/2001 | Namma et al. | |
| 6,205,456 B1 | 3/2001 | Nakao | |
| 6,304,904 B1 | 10/2001 | Sathyanarayan et al. | |
| 6,393,389 B1 | 5/2002 | Chanod et al. | |
| 6,438,579 B1 | 8/2002 | Hosken | |
| 6,466,970 B1 | 10/2002 | Lee et al. | |
| 6,490,577 B1 | 12/2002 | Anwar | |
| 6,662,215 B1 | 12/2003 | Moskowitz et al. | |
| 6,714,929 B1 | 3/2004 | Micaelian et al. | |
| 6,785,676 B2 | 8/2004 | Oblinger | |
| 6,892,238 B2 | 5/2005 | Lee et al. | |
| 6,901,399 B1 | 5/2005 | Corston et al. | |
| 6,907,566 B1 | 6/2005 | McElfresh et al. | |
| 6,925,442 B1 | 8/2005 | Shapira et al. | |
| 7,028,001 B1 | 4/2006 | Muthuswamy et al. | |
| 7,194,454 B2 | 3/2007 | Hansen et al. | |
| 7,340,428 B1 | 3/2008 | White et al. | |
| 7,346,668 B2 | 3/2008 | Willis | |
| 7,349,890 B1 | 3/2008 | Pathak et al. | |
| 7,383,334 B2 | 6/2008 | Wong et al. | |
| 7,428,504 B2 | 9/2008 | Song | |
| 7,475,067 B2 | 1/2009 | Clary et al. | |
| 7,594,189 B1 | 9/2009 | Walker et al. | |
| 7,610,279 B2* | 10/2009 | Budzik ................. G06F 16/242 |
| | | | 707/999.005 |
| 7,649,838 B2 | 1/2010 | Fishteyn et al. | |
| 7,660,581 B2 | 2/2010 | Ramer et al. | |
| 7,668,950 B2 | 2/2010 | Horowitz et al. | |
| 7,814,112 B2 | 10/2010 | Gupta et al. | |
| 8,001,015 B2 | 8/2011 | Perrier et al. | |
| 8,200,683 B2 | 6/2012 | Gupta et al. | |
| 8,255,413 B2* | 8/2012 | Bennett ............... G06F 16/9535 |
| | | | 707/766 |
| 8,631,092 B2 | 1/2014 | Molnar | |
| 8,775,603 B2 | 7/2014 | Hansen | |
| 8,782,200 B2 | 7/2014 | Hansen | |
| 8,954,424 B2 | 2/2015 | Gupta et al. | |
| 9,432,468 B2 | 8/2016 | Karidi et al. | |
| 2002/0026462 A1* | 2/2002 | Shotton, Jr. ......... G06F 16/9577 |
| | | | 715/239 |
| 2002/0069190 A1 | 6/2002 | Geiselhart | |
| 2002/0073165 A1* | 6/2002 | McNulty ............... G06F 16/972 |
| | | | 709/217 |
| 2002/0186237 A1 | 12/2002 | Bradley et al. | |
| 2002/0198882 A1 | 12/2002 | Linden et al. | |
| 2003/0004993 A1* | 1/2003 | Templeton ........... G06F 16/958 |
| | | | 707/E17.116 |
| 2003/0014428 A1 | 1/2003 | Mascarenhas | |
| 2003/0014501 A1 | 1/2003 | Golding et al. | |
| 2003/0014539 A1 | 1/2003 | Reznick | |
| 2003/0018514 A1 | 1/2003 | Billet et al. | |
| 2003/0028527 A1 | 2/2003 | Crosby et al. | |
| 2003/0033299 A1 | 2/2003 | Sundaresan | |
| 2003/0040850 A1 | 2/2003 | Najmi et al. | |
| 2003/0041159 A1* | 2/2003 | Tinsley .................. G06F 9/451 |
| | | | 709/204 |
| 2003/0093427 A1* | 5/2003 | Hsu ....................... G06F 16/957 |
| 2003/0144868 A1 | 7/2003 | Macintyre et al. | |
| 2003/0195877 A1 | 10/2003 | Ford et al. | |
| 2003/0208578 A1 | 11/2003 | Taraborelli et al. | |
| 2003/0216930 A1 | 11/2003 | Dunham et al. | |
| 2004/0068495 A1 | 4/2004 | Inaba et al. | |
| 2004/0098385 A1 | 5/2004 | Mayfield et al. | |
| 2004/0181604 A1 | 9/2004 | Immonen | |
| 2004/0190448 A1 | 9/2004 | Fishteyn et al. | |
| 2005/0033771 A1 | 2/2005 | Schmitter et al. | |
| 2005/0039136 A1 | 2/2005 | Othmer | |
| 2005/0097204 A1 | 5/2005 | Horowitz et al. | |
| 2005/0137939 A1 | 6/2005 | Calabria et al. | |
| 2005/0144064 A1 | 6/2005 | Calabria et al. | |
| 2005/0144065 A1 | 6/2005 | Calabria et al. | |
| 2005/0149390 A1 | 7/2005 | Scholl et al. | |
| 2005/0160107 A1 | 7/2005 | Liang | |
| 2005/0192992 A1 | 9/2005 | Reed et al. | |
| 2005/0256951 A1 | 11/2005 | Shapira et al. | |
| 2005/0256954 A1 | 11/2005 | Shapira et al. | |
| 2005/0288954 A1 | 12/2005 | McCarthy et al. | |
| 2006/0026067 A1 | 2/2006 | Nicholas et al. | |
| 2006/0031340 A1 | 2/2006 | Mathew et al. | |
| 2006/0036400 A1 | 2/2006 | Kasriel et al. | |
| 2006/0074751 A1 | 4/2006 | Kline et al. | |
| 2006/0074864 A1 | 4/2006 | Naam et al. | |
| 2006/0095346 A1 | 5/2006 | Gambhir | |
| 2006/0143093 A1* | 6/2006 | Brandt ................... G16H 10/20 |
| | | | 705/26.1 |
| 2006/0161534 A1 | 7/2006 | Carson, Jr. et al. | |
| 2006/0242129 A1 | 10/2006 | Libes et al. | |
| 2006/0253345 A1 | 11/2006 | Heber | |
| 2006/0259371 A1 | 11/2006 | Perrier et al. | |
| 2006/0277097 A1 | 12/2006 | Shafron et al. | |
| 2006/0277198 A1 | 12/2006 | Error et al. | |
| 2006/0277211 A1 | 12/2006 | Error | |
| 2006/0293921 A1 | 12/2006 | McCarthy et al. | |
| 2007/0002377 A1 | 1/2007 | Tokunaga | |
| 2007/0005417 A1 | 1/2007 | Desikan et al. | |
| 2007/0038508 A1 | 2/2007 | Jain et al. | |
| 2007/0038516 A1 | 2/2007 | Apple et al. | |
| 2007/0050268 A1 | 3/2007 | Han et al. | |
| 2007/0061412 A1* | 3/2007 | Karidi ................... H04L 67/535 |
| | | | 707/E17.116 |
| 2007/0073585 A1 | 3/2007 | Apple et al. | |
| 2007/0088670 A1 | 4/2007 | Reller et al. | |
| 2007/0100803 A1 | 5/2007 | Cava | |
| 2007/0100992 A1 | 5/2007 | Wong et al. | |
| 2007/0150353 A1 | 6/2007 | Krassner et al. | |
| 2007/0180147 A1* | 8/2007 | Leigh .................... G06Q 30/02 |
| | | | 709/246 |
| 2007/0233565 A1 | 10/2007 | Herzog et al. | |
| 2007/0239542 A1 | 10/2007 | Shapiro | |
| 2007/0265923 A1 | 11/2007 | Krassner et al. | |
| 2007/0266923 A1 | 11/2007 | Orr et al. | |
| 2007/0271238 A1 | 11/2007 | Webster et al. | |
| 2007/0288433 A1 | 12/2007 | Gupta et al. | |
| 2007/0288950 A1 | 12/2007 | Downey et al. | |
| 2007/0291739 A1 | 12/2007 | Sullivan et al. | |
| 2008/0010142 A1 | 1/2008 | O'Brien et al. | |
| 2008/0015877 A1 | 1/2008 | McKenna et al. | |
| 2008/0015933 A1 | 1/2008 | McKenna et al. | |
| 2008/0033799 A1 | 2/2008 | McKenna et al. | |
| 2008/0033800 A1 | 2/2008 | McKenna et al. | |
| 2008/0033801 A1 | 2/2008 | McKenna et al. | |
| 2008/0033802 A1 | 2/2008 | McKenna et al. | |

(56) References Cited

U.S. PATENT DOCUMENTS

| | | |
|---|---|---|
| 2008/0033803 A1 | 2/2008 | McKenna et al. |
| 2008/0033804 A1 | 2/2008 | McKenna et al. |
| 2008/0127249 A1 | 5/2008 | Cruice |
| 2008/0242280 A1 | 10/2008 | Shapiro et al. |
| 2008/0256056 A1 | 10/2008 | Chang et al. |
| 2008/0270412 A1 | 10/2008 | Udayasankar et al. |
| 2008/0270510 A1 | 10/2008 | Kolinek |
| 2008/0275770 A1 | 11/2008 | Kitts |
| 2008/0275863 A1 | 11/2008 | Dominowska et al. |
| 2008/0275980 A1 | 11/2008 | Hansen |
| 2008/0294621 A1 | 11/2008 | Kanigsberg et al. |
| 2009/0002549 A1 | 1/2009 | Kobayashi |
| 2009/0006179 A1 | 1/2009 | Billingsley et al. |
| 2009/0019019 A1 | 1/2009 | Jones et al. |
| 2009/0171764 A1 | 7/2009 | Bellaiche et al. |
| 2010/0017398 A1 | 1/2010 | Gupta et al. |
| 2011/0106729 A1 | 5/2011 | Billingsley et al. |
| 2013/0246407 A1 | 9/2013 | Gupta et al. |

OTHER PUBLICATIONS

Braudaway D.W., "How Artificial Intelligence Has Helped and Hindered Calibration", Abstract Only, Jan. 1, 2001, 1 page.

Buyukkokten O., et al., "Efficient Web Browsing in Handheld Devices Using Page and Form Summarization", ACM Transactions on Information Systems, vol. 20, No. 01, Jan. 2002, 34 pages.

Chan S.S., et al., "Usability for Mobile Commerce Across Multiple Form Factors", Journal of Electronic Commerce Research, 2002, vol. 3, No. 3, 13 pages.

Final Office Action for U.S. Appl. No. 11/679,973, mailed on Aug. 21, 2009, 12 pages.

Hassel M., et al., "SweSum-Automatic Text Summarizer", Aug. 17, 2005, Retrieved from the Internet URL: http://swesum.nada.kth.se/index-eng.html/, 1 page.

International Preliminary Report on Patentability for International Application No. PCT/US2008/008024 mailed on Jan. 14, 2010, 7 pages.

International Search Report and Written Opinion for International Application No. PCT/US2008/008024 mailed on Oct. 1, 2008, 10 pages.

International Search Report and Written Opinion for International Application No. PCT/US2008/008024 mailed on Oct. 1, 2008, 5 pages.

U.S. Appl. No. 11/679,973, Advisory Action mailed Nov. 23, 2009, 3 pages.

U.S. Appl. No. 11/679,973, Appeal Brief Filed May 13, 2010, 24 pages.

U.S. Appl. No. 11/679,973, Decision on Pre-Appeal Brief Request mailed Apr. 13, 2010, 2 pages.

U.S. Appl. No. 11/679,973, Final Office Action dated Aug. 21, 2009, 13 pages.

U.S. Appl. No. 11/679,973, Non-Final Office Action dated Mar. 18, 2009, 9 pages.

U.S. Appl. No. 11/679,973, Notice of Allowance mailed Jun. 9, 2010, 17 pages.

U.S. Appl. No. 11/679,973, Pre-Appeal Brief Request filed Dec. 21, 2009, 5 pages.

U.S. Appl. No. 11/679,973, Response filed Jun. 12, 2009 to Non-Final Office Action mailed Mar. 18, 2009, 12 pages.

U.S. Appl. No. 11/679,973, Response filed Nov. 5, 2009 to Final Office Action mailed Aug. 21, 2009, 13 pages.

U.S. Appl. No. 11/821,928, Examiner Interview Summary mailed Aug. 1, 2014, 3 pages.

U.S. Appl. No. 11/821,928, Final Office Action dated Sep. 3, 2015, 16 pages.

U.S. Appl. No. 11/821,928, Final Office Action mailed Apr. 29, 2014, 22 pages.

U.S. Appl. No. 11/821,928, Final Office Action mailed Mar. 14, 2011, 29 pages.

U.S. Appl. No. 11/821,928, Non-Final Office Action mailed Apr. 29, 2010, 21 pages.

U.S. Appl. No. 11/821,928, Non-Final Office Action mailed Aug. 23, 2013, 23 pages.

U.S. Appl. No. 11/821,928, Non-Final Office Action mailed May 12, 2015, 12 pages.

U.S. Appl. No. 11/821,928, Preliminary Amendment filed on Jun. 26, 2008, 7 pages.

U.S. Appl. No. 11/821,928, Response filed Aug. 12, 2015 to Non-Final office action mailed May 12, 2015, 17 pages.

U.S. Appl. No. 11/821,928, Response filed Aug. 30, 2010 to Non-Final office action mailed Apr. 29, 2010, 10 pages.

U.S. Appl. No. 11/821,928, Response filed Feb. 24, 2014 to Non-Final Office Action mailed Aug. 23, 2013, 7 pages.

U.S. Appl. No. 11/821,928, Response filed Jan. 5, 2011 to Restriction Requirement mailed Nov. 5, 2011, 6 pages.

U.S. Appl. No. 11/821,928, Response filed Jul. 29, 2014 to final office action mailed Apr. 29, 2014, 12 pages.

U.S. Appl. No. 11/821,928, Response filed May 16, 2011 to final office action mailed Mar. 14, 2011, 8 pages.

U.S. Appl. No. 11/821,928, Restriction Requirement mailed Nov. 5, 2010, 6 pages.

U.S. Appl. No. 12/495,663, Final Office Action mailed Mar. 28, 2011, 11 pages.

U.S. Appl. No. 12/495,663, Non Final Office Action mailed Nov. 17, 2010, 17 pages.

U.S. Appl. No. 12/495,663, Notice of Allowance mailed Feb. 15, 2012, 14 pages.

U.S. Appl. No. 12/495,663, Response filed Feb. 17, 2011 to Non-Final Office Action mailed Nov. 17, 2010, 13 pages.

U.S. Appl. No. 12/495,663, Response filed Jun. 28, 2011 to Final Office Action mailed Mar. 28, 2011, 14 pages.

U.S. Appl. No. 13/005,408, Examiner Interview Summary mailed Jul. 29, 2014, 3 pages.

U.S. Appl. No. 13/005,408, Final Office Action mailed Apr. 15, 2014, 14 pages.

U.S. Appl. No. 13/005,408, Non-Final Office Action mailed Aug. 14, 2013, 23 pages.

U.S. Appl. No. 13/005,408, Response filed Feb. 14, 2014 to Non-Final Office Action mailed Aug. 14, 2013, 8 pages.

U.S. Appl. No. 13/491,183, Advisory Action mailed May 27, 2014, 3 pages.

U.S. Appl. No. 13/491,183, Appeal Brief Filed Aug. 25, 2014, 18 pages.

U.S. Appl. No. 13/491,183, Appeal Brief Filed Oct. 23, 2015, 18 pages.

U.S. Appl. No. 13/491,183, Decision on Pre-Appeal Brief Request dated Jul. 24, 2014, 2 pages.

U.S. Appl. No. 13/491,183, Examiner's Answer to Appeal Brief mailed Feb. 29, 2016, 10 pages.

U.S. Appl. No. 13/491,183, Final Office Action mailed Apr. 10, 2013, 15 pages.

U.S. Appl. No. 13/491,183, Final Office Action mailed Feb. 23, 2015, 23 pages.

U.S. Appl. No. 13/491,183, Final Office Action mailed Mar. 6, 2014, 19 pages.

U.S. Appl. No. 13/491,183, Non-Final Office Action mailed Aug. 7, 2013, 14 pages.

U.S. Appl. No. 13/491,183, Non-Final Office Action mailed Nov. 6, 2014, 21 pages.

U.S. Appl. No. 13/491,183, Non-Final Office Action mailed Nov. 15, 2012, 13 pages.

U.S. Appl. No. 13/491,183, Pre-Appeal Brief Request filed Jun. 6, 2014, 4 pages.

U.S. Appl. No. 13/491,183, Response filed Feb. 6, 2015 to Non-Final Office Action mailed Nov. 6, 2014, 9 pages.

U.S. Appl. No. 13/491,183, Response filed Feb. 15, 2013 to Non-Final Office Action mailed Nov. 15, 2012, 10 pages.

U.S. Appl. No. 13/491,183, Response filed Jan. 7, 2014 to Non-Final Office Action mailed Sep. 7, 2013, 7 pages.

U.S. Appl. No. 13/491,183, Response filed Jul. 10, 2013 to Final Office Action mailed Apr. 10, 2013, 10 pages.

(56) References Cited

OTHER PUBLICATIONS

U.S. Appl. No. 13/491,183, Response filed May 6, 2014 to Final Office Action mailed Mar. 6, 2014, 8 pages.

U.S. Appl. No. 13/875,074, Final Office Action mailed Nov. 27, 2013, 21 pages.

U.S. Appl. No. 13/875,074, Non-Final Office Action mailed Jun. 27, 2013, 17 pages.

U.S. Appl. No. 13/875,074, Notice of Allowance mailed Aug. 4, 2014, 16 pages.

U.S. Appl. No. 13/875,074, Preliminary Amendment May 7, 2013, 5 pages.

U.S. Appl. No. 13/875,074, Response filed Feb. 27, 2014 to Final Office Action mailed Nov. 27, 2013, 10 pages.

U.S. Appl. No. 13/875,074, Response filed Oct. 28, 2013 to Non-Final Office Action mailed Jun. 27, 2013, 16 pages.

Yang C.C., et al., "Fractal Summarization for Mobile Devices to Access Large Documents on the Web", Retrieved from Internet URL: http://wwwconf.ecs.soton.ac.uk/archive/00000482/01/p681-yang.html, Proceedings of International WWW Conference, May 20-24, 2003, 17 pages.

* cited by examiner

418

2
ANALYZE (E.G., MODULES 405-409) 502

1
COLLECT (E.G., MODULES 402-404) 501

FEEDBACK LOOP

3
DEPLOY (E.G., MODULES 410-414, 417) 503

4
EXECUTE/DISPLAY (E.G., MODULE 401) 504

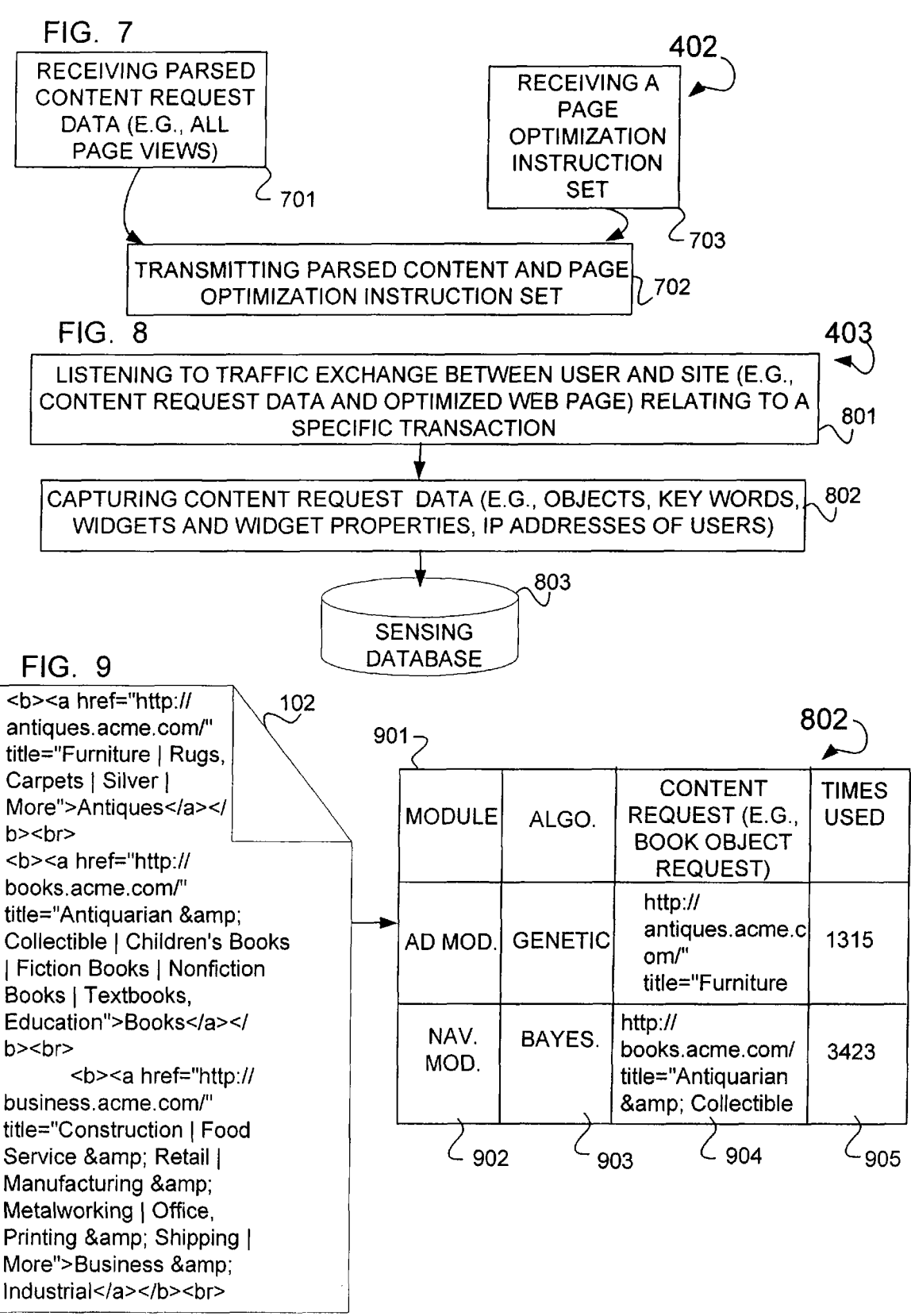

FIG. 7

RECEIVING PARSED CONTENT REQUEST DATA (E.G., ALL PAGE VIEWS) 701

RECEIVING A PAGE OPTIMIZATION INSTRUCTION SET 402 703

TRANSMITTING PARSED CONTENT AND PAGE OPTIMIZATION INSTRUCTION SET 702

FIG. 8 403

LISTENING TO TRAFFIC EXCHANGE BETWEEN USER AND SITE (E.G., CONTENT REQUEST DATA AND OPTIMIZED WEB PAGE) RELATING TO A SPECIFIC TRANSACTION 801

CAPTURING CONTENT REQUEST DATA (E.G., OBJECTS, KEY WORDS, WIDGETS AND WIDGET PROPERTIES, IP ADDRESSES OF USERS) 802

SENSING DATABASE 803

FIG. 9

```
<b><a href="http://
antiques.acme.com/"
title="Furniture | Rugs,
Carpets | Silver |
More">Antiques</a></
b><br>
<b><a href="http://
books.acme.com/"
title="Antiquarian &
Collectible | Children's Books
| Fiction Books | Nonfiction
Books | Textbooks,
Education">Books</a></
b><br>
        <b><a href="http://
business.acme.com/"
title="Construction | Food
Service & Retail |
Manufacturing &
Metalworking | Office,
Printing & Shipping |
More">Business &
Industrial</a></b><br>
```
102

| MODULE | ALGO. | CONTENT REQUEST (E.G., BOOK OBJECT REQUEST) | TIMES USED |
|--------|-------|---------------------------------------------|------------|
| AD MOD. | GENETIC | http://antiques.acme.com/" title="Furniture | 1315 |
| NAV. MOD. | BAYES. | http://books.acme.com/ title="Antiquarian & Collectible | 3423 |

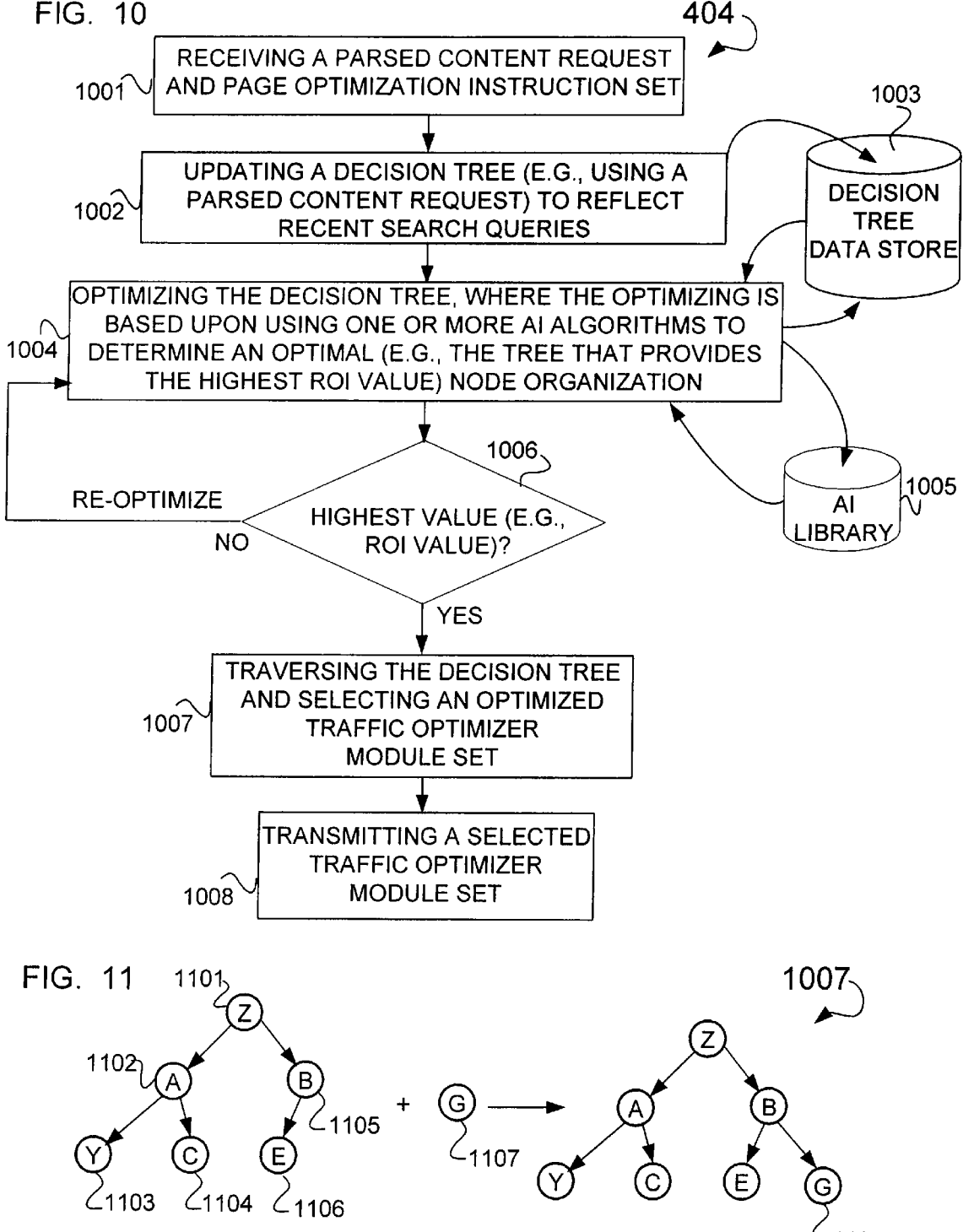

404

1001 — RECEIVING A PARSED CONTENT REQUEST AND PAGE OPTIMIZATION INSTRUCTION SET

1002 — UPDATING A DECISION TREE (E.G., USING A PARSED CONTENT REQUEST) TO REFLECT RECENT SEARCH QUERIES

1003

DECISION TREE DATA STORE

1004 — OPTIMIZING THE DECISION TREE, WHERE THE OPTIMIZING IS BASED UPON USING ONE OR MORE AI ALGORITHMS TO DETERMINE AN OPTIMAL (E.G., THE TREE THAT PROVIDES THE HIGHEST ROI VALUE) NODE ORGANIZATION

1006

RE-OPTIMIZE

NO

HIGHEST VALUE (E.G., ROI VALUE)?

YES

1005

AI LIBRARY

1007 — TRAVERSING THE DECISION TREE AND SELECTING AN OPTIMIZED TRAFFIC OPTIMIZER MODULE SET

1008 — TRANSMITTING A SELECTED TRAFFIC OPTIMIZER MODULE SET

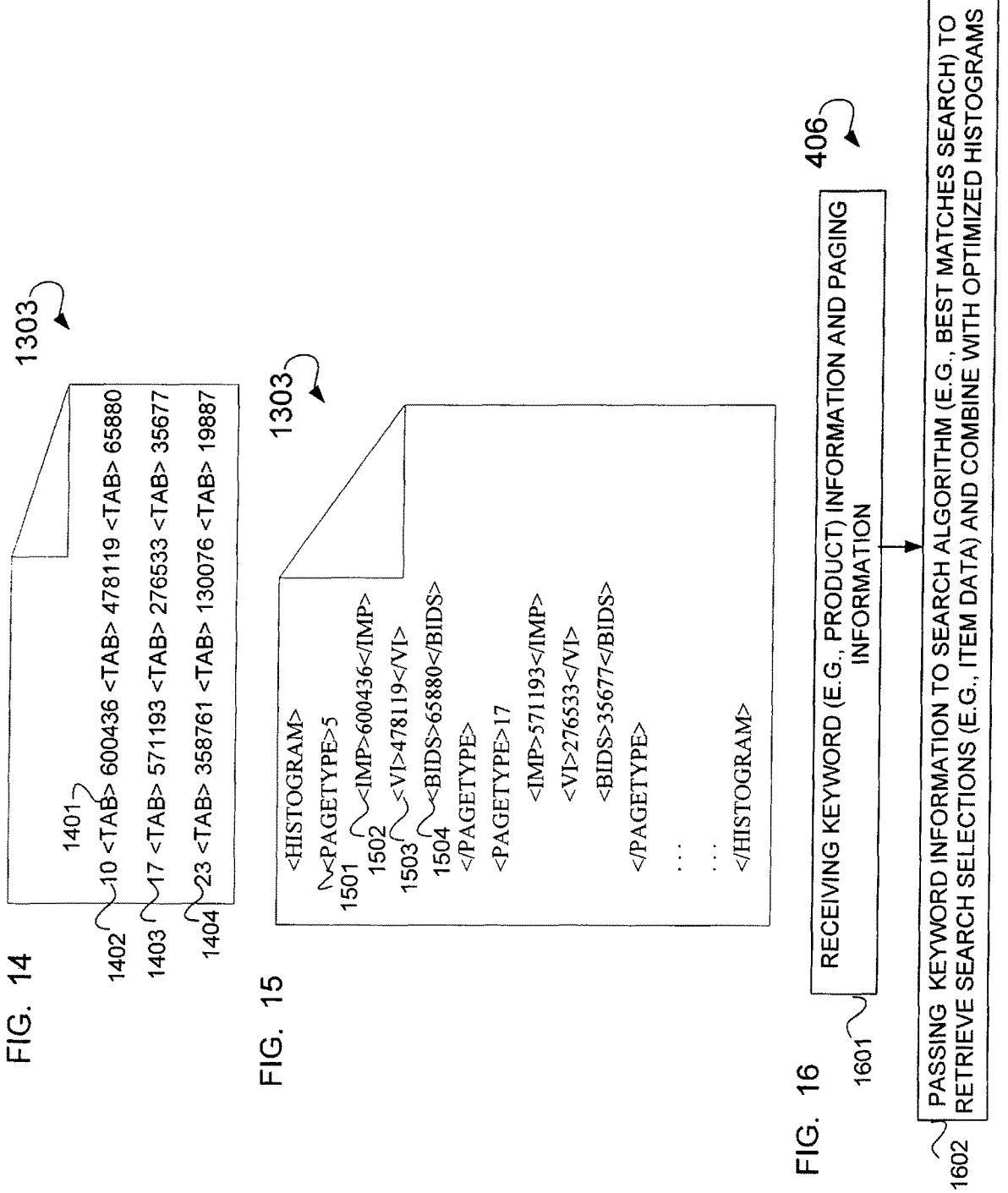

FIG. 14    1303

1401
1402 10 <TAB> 600436 <TAB> 478119 <TAB> 65880
1403 17 <TAB> 571193 <TAB> 276533 <TAB> 35677
1404 23 <TAB> 358761 <TAB> 130076 <TAB> 19887

FIG. 15    1303

```
<HISTOGRAM>
     <PAGETYPE>5
1501     <IMP>600436</IMP>
     1502     <VI>478119</VI>
     1503     <BIDS>65880</BIDS>
     1504 </PAGETYPE>
     <PAGETYPE>17
          <IMP>571193</IMP>
          <VI>276533</VI>
          <BIDS>35677</BIDS>
     </PAGETYPE>
          :        :
          :        :
</HISTOGRAM>
```

FIG. 16    406

1601 RECEIVING KEYWORD (E.G., PRODUCT) INFORMATION AND PAGING INFORMATION

1602 PASSING KEYWORD INFORMATION TO SEARCH ALGORITHM (E.G., BEST MATCHES SEARCH) TO RETRIEVE SEARCH SELECTIONS (E.G., ITEM DATA) AND COMBINE WITH OPTIMIZED HISTOGRAMS

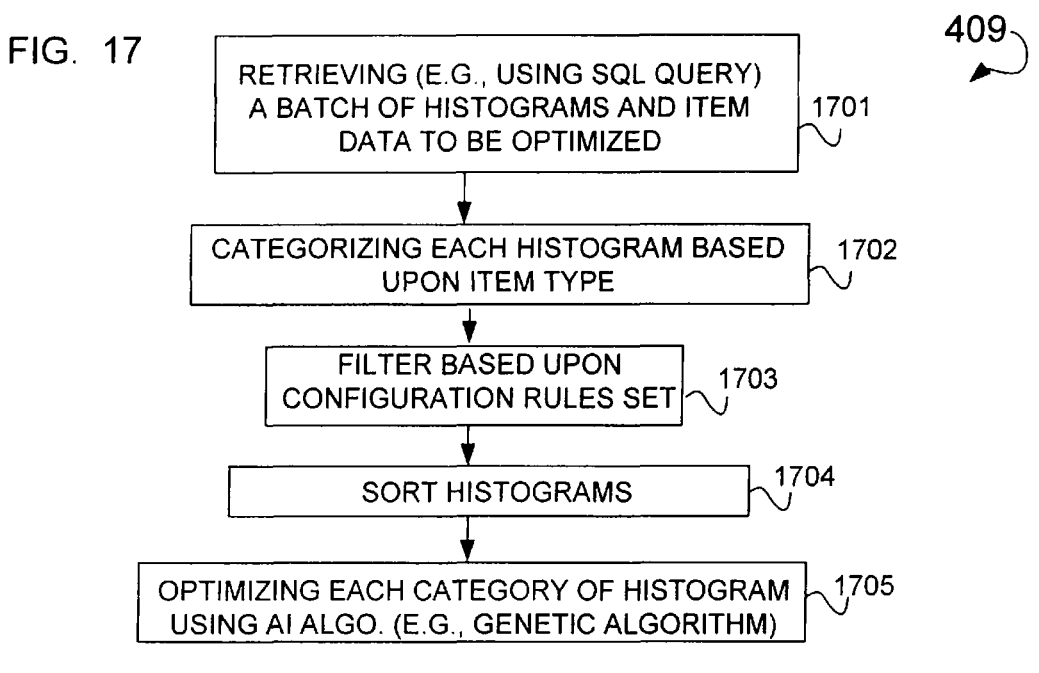

RETRIEVING (E.G., USING SQL QUERY) A BATCH OF HISTOGRAMS AND ITEM DATA TO BE OPTIMIZED 1701

CATEGORIZING EACH HISTOGRAM BASED UPON ITEM TYPE 1702

FILTER BASED UPON CONFIGURATION RULES SET 1703

SORT HISTOGRAMS 1704

OPTIMIZING EACH CATEGORY OF HISTOGRAM USING AI ALGO. (E.G., GENETIC ALGORITHM) 1705

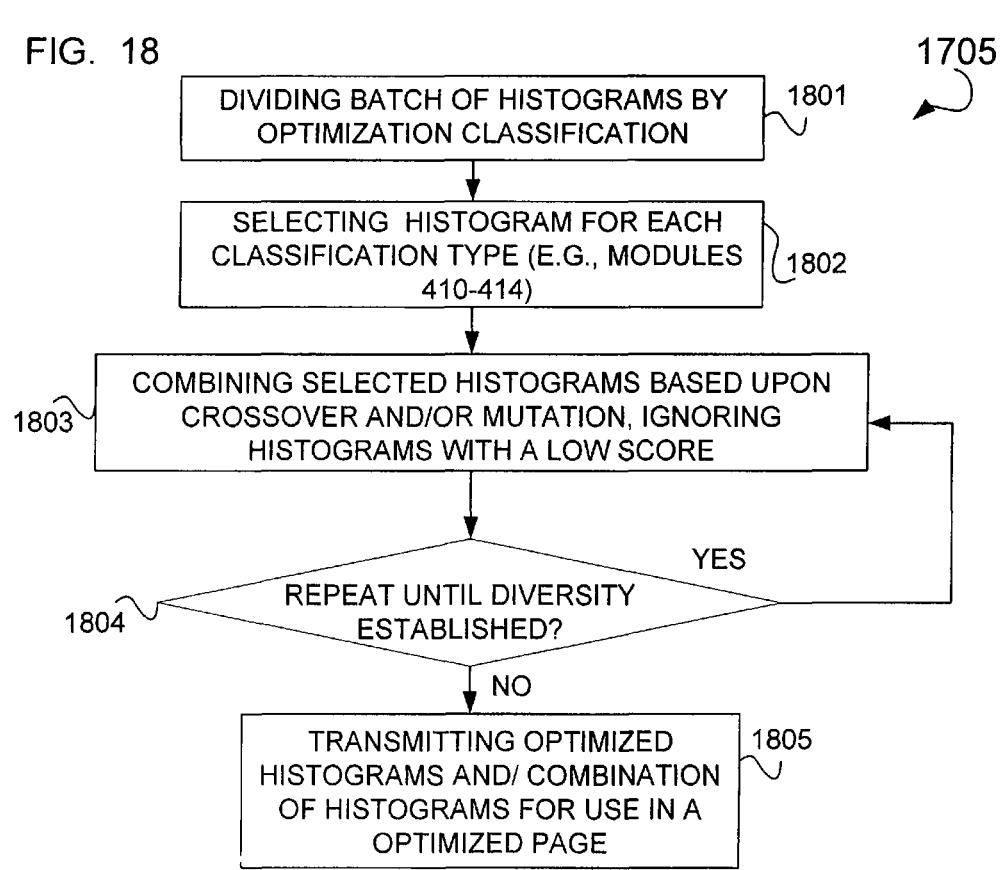

DIVIDING BATCH OF HISTOGRAMS BY OPTIMIZATION CLASSIFICATION 1801

SELECTING HISTOGRAM FOR EACH CLASSIFICATION TYPE (E.G., MODULES 410-414) 1802

1803 COMBINING SELECTED HISTOGRAMS BASED UPON CROSSOVER AND/OR MUTATION, IGNORING HISTOGRAMS WITH A LOW SCORE

1804 REPEAT UNTIL DIVERSITY ESTABLISHED?

YES

NO

TRANSMITTING OPTIMIZED HISTOGRAMS AND/ COMBINATION OF HISTOGRAMS FOR USE IN A OPTIMIZED PAGE 1805

412

1901   RECEIVING HISTOGRAM DATA RELATING TO ADVERTISING

1902   OPTIMIZING (E.G., BASED UPON ROI VALUE) OBJECTS AND WIDGETS DICTATED BY THE HISTOGRAM USING AN AI ALGO.

1005   AI LIBRARY

1903   RETRIEVING AND TRANSMITTING OBJECT SELECTION DATA (E.G., PAGE OPTIMIZATION INSTRUCTION SET) BASED UPON HISTOGRAM RELATING TO ADVERTISING

CONTENT (E.G., REVIEWS AND GUIDES REGARDING PRODUCTS FOR SALE) — 2203

INVENTORY (E.G., DESCRIPTION OF ITEMS FOR SALE) — 2204

CATALOG (E.G., ID INFORMATION FOR PRODUCTS) — 2205

DEMAND DATA (E.G., USER SELECTION INFORMATION) — 2206

AI LIBRARY — 1005

RECEIVING A CONTENT REQUEST (E.G., SEARCH FOR A KEYWORD) — 2301

RETRIEVING CONTENT BASED UPON MOST RECOMMENDED (E.G., THAT PREDICTED BY AI GENERATED MODEL) — 2302

TRANSMITTING CONTENT (E.G., ITEM INFORMATION) FOR INCLUSION WITH OPTIMIZED WEB PAGE — 2303

416

```
<RULES SET>
<AD OBJECT>645
       <VALUE>0</VALUE>
</AD OBJECT>          2403
<AD OBJECT>758
       <VALUE>1</VALUE>          2404
</ AD OBJECT>
. . .
. . .
</RULES SET>
```

2401
2402

417

| RECEIVING AND PARSING A CONFIG. RULES SET | 2501 |

↓

| TRANSMITTING A RULES VALUE TO AN OPTIMIZATION ENGINE SUCH THAT THE RULE RELATING TO AN OBJECT (E.G., ADVERTISING IMAGE) IS GIVEN PRIORITY BY A MODULE (E.G., AD MODULE) | 2502 |

2600

COMPUTER SYSTEM

ECONOMIC OPTIMIZATION FOR PRODUCT SEARCH RELEVANCY

CROSS-REFERENCE TO RELATED APPLICATIONS

The present application is a continuation of U.S. application Ser. No. 17/461,707, entitled "ECONOMIC OPTIMIZATION FOR PRODUCT SEARCH RELEVANCY," filed Aug. 30, 2021, which is a continuation of U.S. application Ser. No. 16/590,337, entitled "ECONOMIC OPTIMIZATION FOR PRODUCT SEARCH RELEVANCY," filed Oct. 1, 2019 (now U.S. Pat. No. 11,120,098), which is a continuation of U.S. application Ser. No. 14/987,689, entitled "ECONOMIC OPTIMIZATION FOR PRODUCT SEARCH RELEVANCY," filed Jan. 4, 2016 (now U.S. Pat. No. 10,430,724), which is a continuation of U.S. application Ser. No. 11/821,928, entitled "Economic optimization for product search relevancy," filed Jun. 26, 2007 (now abandoned); the disclosures of each of the above-referenced applications are incorporated by reference herein in their entireties.

TECHNICAL FIELD

Example embodiments relate generally to the technical field of commercial uses of business rule algorithms implemented on a computer and, in one specific example, the use of such algorithms to display web pages.

BACKGROUND

Web pages, and the business rules that govern them, are typically static in nature. That is, the logic dictating when certain web pages are to be displayed in response to a user's query must be re-written every time a designer of a web page would like to have the user view new web pages. The same holds true for the objects or widgets displayed on a web page. Namely every time a new object is introduced on a web page, the logic governing the page upon which the new objects are introduced must be changed.

BRIEF DESCRIPTION OF THE DRAWINGS

Some embodiments are illustrated by way of example and not limitation in the figures of the accompanying drawings in which:

FIG. 7 is a flow chart of an example method used to implement a tracking and exchange operations, according to an example embodiment.

FIG. 8 is a flowchart illustrating a method used to implement a sensing application operation, according to an example embodiment.

FIG. 9 is a diagram of an operation to capture content request data, according to an example embodiment.

FIG. 10 is a flowchart illustrating a method used to implement a decisional engine, according to an example embodiment.

FIG. 11 is a network diagram of a decision tree that may result from the execution of an operation that determines whether or not a highest value has been returned as a result of the execution of a particular AI algorithm contained in an AI library, according to an example embodiment.

FIG. 14 is a diagram of a histogram illustrating a number of data entries with each field for each of the data entries delimited by a tab character, according to an example embodiment.

FIG. 15 is a diagram of a histogram wherein the histogram is written using some type of tagging language such as eXtensible Markup Language (XML) and contains information relating to which page type should be used by the page type module, according to an example embodiment.

FIG. 16 is a flowchart illustrating a method used to implement a demand services backend, according to an example embodiment.

FIG. 17 is a flowchart illustrating a method used to implement a traffic optimizer engine, according to an example embodiment.

FIG. 18 is a flowchart illustrating a method used to implement an operation to optimize each category of histogram using an AI algorithm, according to an example embodiment.

FIG. 23 is a flowchart illustrating a method used to implement a search backend, according to an example embodiment, according to an example embodiment, according to an example embodiment.

DETAILED DESCRIPTION

Figure 1:
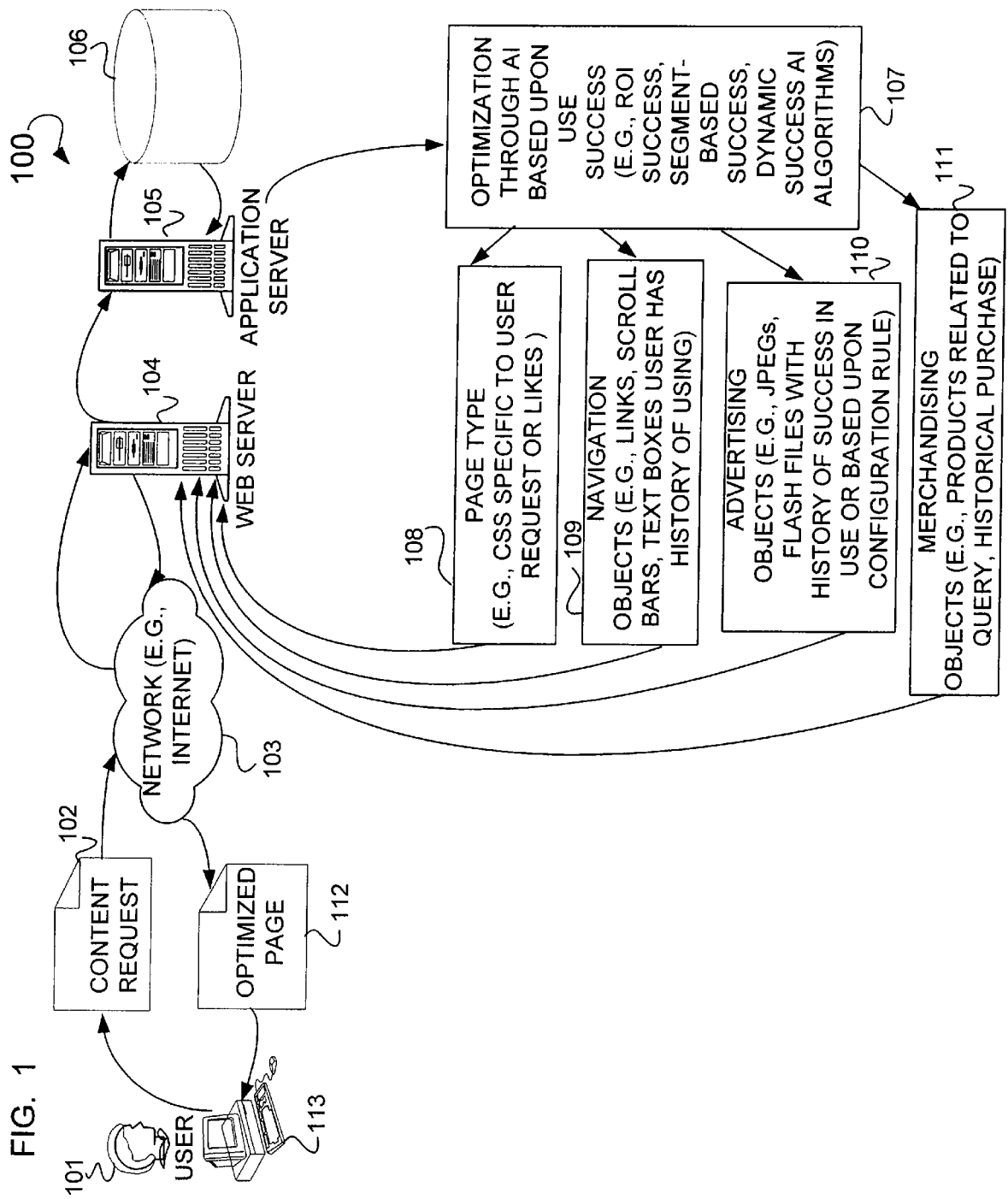
FIG. 1 is a diagram of a system illustrating the optimization of a web page, according to an example embodiment.

In the following description, for purposes of explanation, numerous specific details are set forth to provide a thorough understanding of example embodiments. It may be evident, however, to one skilled in the art, that the present invention may be practiced without these specific details.

In one embodiment, the method and system illustrated herein may be thought of as a series of modules executed through a feedback loop to optimize a web page, and the selection of screen objects and widgets (collectively objects) to be displayed thereon. The data provided to this feedback loop, in the form of a content request, serves as a training data set for training particular types of AI algorithms. This training data set may then be used by a plurality of AI algorithms for the purpose of making predictions as to which objects or screen widgets would be best suited for the purposes of optimizing a web page. The concept of "optimizing" may be based upon such concepts as Return On Investment (ROI) values, or other type of values.

In some embodiments, web pages, and the object contained thereon, are optimized (e.g., optimizing) using certain algorithms (e.g., AI algorithms) so as to maximize the ROI for each web page. These algorithms may use histograms containing aggregations of data relating to, for example, keyword usage, traffic optimizer module usage, and/or object/widget usage for a particular webpage. Put another way, this histogram may be used as the basis upon which to determine the allocation of space (e.g., floor plan space) within an optimized web page. In some embodiments, a web page is akin to a piece of real estate, and, in one embodiment, the system and method illustrated herein seeks to maximize the ROI for the displayed area within a web page. The histogram may be used to chart a particular user profile by aggregating data relating to the particular user. These histograms may then be combined together so as to create a set of user data that can then be analyzed for certain trends so as to determine an ROI for a particular allocation of space on a web page and respective user or group of users.

Some embodiments may include ROI understood as, for example, the difference between the cost of generating a web page (e.g., labor costs associated with coding the web page, modifying the page to add or remove content from the web page, presenting search results, cost of access to system resources in terms of time, memory, Central Processing Unit (CPU) cycles etc., making a web page scalable etc.), and the revenue generated by the web page. Example embodiments may include the business rules governing such web pages that are optimized in an automated or an organic manner such that rather than being static, the web pages and content contained therein are dynamic, reflecting, for example, the information relating to the optimal way to present a web page in order to market a particular good (e.g., diamonds) or service. For example, rather than having a web page always contain pictures of diamonds, a web page may only contain such picture, if it is shown that web pages containing such pictures are more successful in selling diamonds than web pages without such pictures. And again, rather than, for example, having a web page only contain pictures of diamonds, certain objects may also be presented on the page, where the combination of the pictures of diamonds and these screen objects yields a higher ROI than a picture with pictures of diamond alone. The determination of what constitutes success, however, may, in some cases, be based upon certain algorithms seeking to maximize ROI for a web page, rather than strictly based upon the decisions of a marketing professional. Further, success may be a preferred ROI such that a high, lower, or some other suitable ROI is sought based upon the desires of a user, or other implementing the system and method illustrated herein.

Web pages are typically governed by static business rules (e.g., logics) such that anytime a new web page is introduced, a web page containing additional objects, or most any other modification is made, these business rules must also be changed. This results in many hours being spent by designers of web pages and websites changing a web page or web site to meeting the marketing needs of a particular company. In the commercial setting (e.g., the e-commerce setting), the time spent by designers of web pages to add or remove a web page, object, or widget contained on a web page can be very costly financially to the party paying for the services of the designer. More to the point, not only may the designer have to write the new web page, but they may also have to write new business rules to govern this new web page. For example, if a new object in the form of a new link is added to an existing web page, then the scripting language governing this page (e.g., JavaScript, VBScript) may also have to be rewritten.

Further, from an e-commerce marketing perspective, the approach of having a designer rewrite the business rules is always done after a new marketing scheme or approach has become "predominant." That is, in many cases, a designer of a web page is only instructed to modify a web page after a particular use of a web page has been observed to be advantageous from a marketing perspective. This observation, however, may not occur for some period of time and only after several types of analysis and several layers or reviews have occurred. For example, if it is observed that sales of diamonds are more successful on a web page that provides objects or widgets that allow a user to better understand cut, clarity, and color, then the designer may be instructed to generate web pages containing such objects or widgets. However, this observation may only occur after the analysis, by a marketing or financial analyst, of sales figures for pages containing such objects or widgets. Only when such an analysis is conducted can a designer be asked to make changes to the web pages such that they contain these objects or widgets. Such an approach costs an e-commerce site valuable time during which they could have been implementing the objects or widgets relating to cut, clarity, and color.

A System for Economic Optimization for Product Search Relevancy

FIG. 1 is a diagram of an example system 100 illustrating the optimization of a web page. Illustrated is a user 101 using a computer system 113 that generates a content request 102. This content request 102 may be in the form of a web page query generated using a Hypertext Transfer Protocol (HTTP). This content request 102 is transmitted over a network 103. In some cases, this network 103 is, for example, an internet. Once the content request 102 is transmitted over the network 103, it is received by a web server 104, wherein the web server 104 then transmits the content request 102 to an application server 105. When received by the application server 105, the content request 102 is, in some cases, parsed and used to provide an answer to the content request 102 in the form of an optimized page 112. During the course of providing this answer, data may be retrieved from a content database 106. This data may, as may be more fully illustrated below, be in the form of web links to certain web pages, screen objects or widgets, or other type of data commonly appearing on, for example, a web page. Once this content request 102 is parsed, a module 107 optimizes this data through applying various Artificial Intelligence (AI) algorithms. These AI algorithms are applied based upon such criteria as ROI success, segment base success, or some type of dynamic measure of success. This module 107, in some cases, may then pass the data, retrieved from the database 106, through a variety of other modules. These additional modules include, for example, a module 108 used to optimize for a specific page type, a module 109 used to optimize certain navigation objects such as, for example, links, scroll bars, text boxes or other suitable navigation objects or widgets. A module 110 is used to optimize advertising objects or widgets such as, for example, Joint Photographic Expert Group (JPEG) images, flash files, or other suitable advertising objects or widgets. A further module that may be used is a merchandizing module 111 used to optimize merchandizing objects. Once these various modules (e.g., 107-111) are used to optimize the data, an optimized page 112 is generated and sent back across the network 103 to the computer system 113 for viewing by the user 101. The web server 104 may send this optimized page 112 across the network 103 to the computer system 113 or, in some cases, the application server 105 itself may send this optimized page 112 to the computer system 113 (not illustrated).

Figure 2:
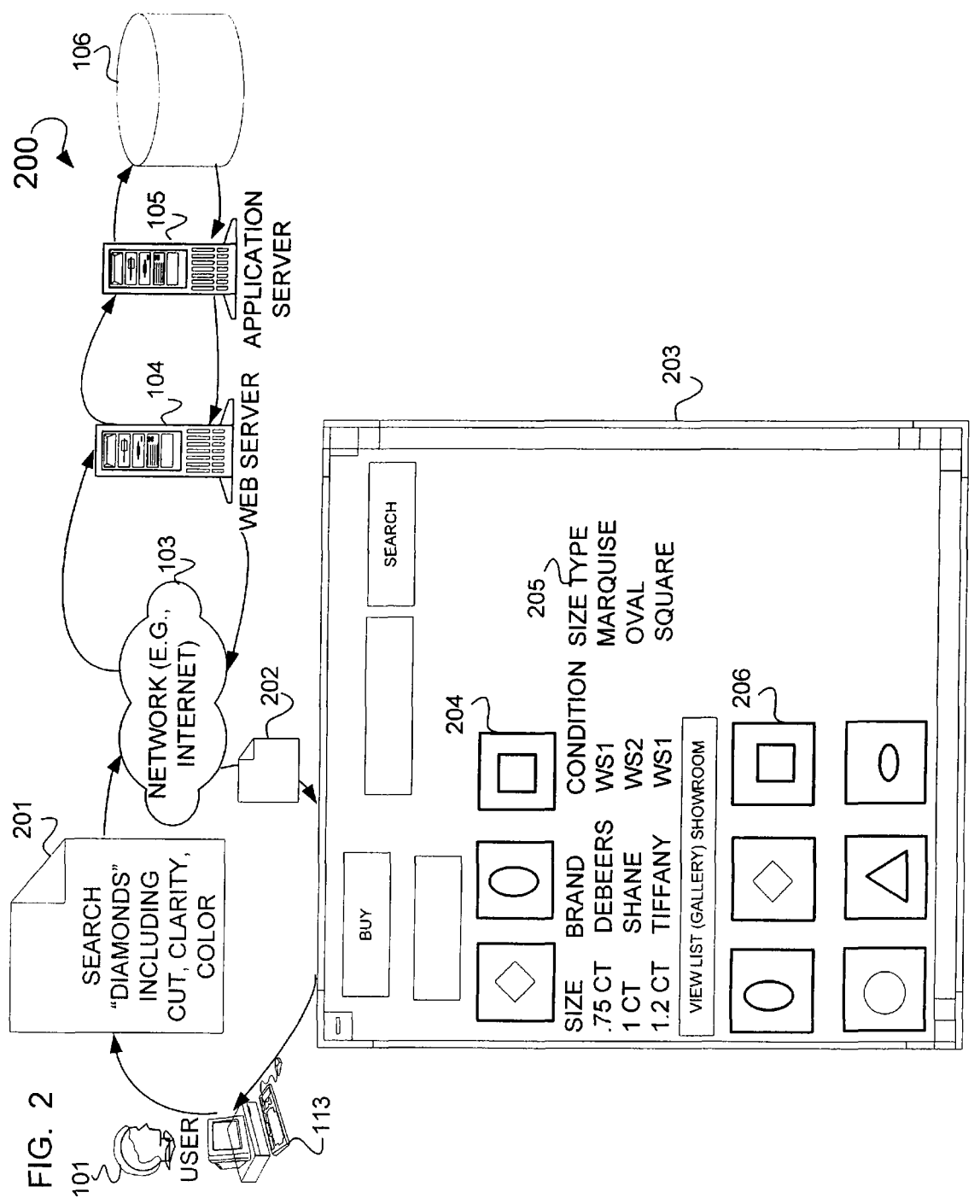
FIG. 2 is a diagram of a system illustrating the environment of one embodiment wherein a content request is made and, in response to the content request, a non-optimized web page is furnished, according to an example embodiment.

FIG. 2 is a diagram of an example system 200 illustrating the environment of one embodiment wherein a content request is made, and, in response to the content request, a non-optimized web page 202 is furnished. Shown is a user 101, who, using a computer system 113, generates a content request 201 relating, for example, to diamonds, and, in particular, a query regarding the cut, color, and clarity of diamonds available for sale. This content request 201 is transmitted by the computer system 113 over the network 103 to a web server 104, and ultimately to an application server 105. Once received by the application server 105, the content request 201 is parsed and a web page is generated using, for example, objects and widgets retrieved from the content database 106. In contrast to the description of the system 100, a non-optimized web page 202 is returned in response to the content request 201. This non-optimized web page 202 is transmitted over the network 103 for viewing by the user 101 on the computer system 113. Additionally, illustrated is a Graphical User Interface (GUI) 203 containing a series of JPEG objects or photos 204, a field 205 containing a description of various aspects of the diamonds displayed in the JPEG 204, and a further JPEG field 206 containing pictures of other diamonds for sale. In some cases, this non-optimized web page 202 could be considered as a page generated through static business rules or logic. These static business rules or logic control objects or widgets (e.g., JPEG 204, 206, and field 205) in a non-optimized web page 202 displayed, or generated, not individually based upon the content request 201, but rather generated generically, in response to, a content request such as content request 201. Put another way, the objects or widgets appearing on web page 202 are not tailored to a specific user content request 201, and do not adapt to what screen objects or widgets performed well in the past, or poorly in the past.

Figure 3:
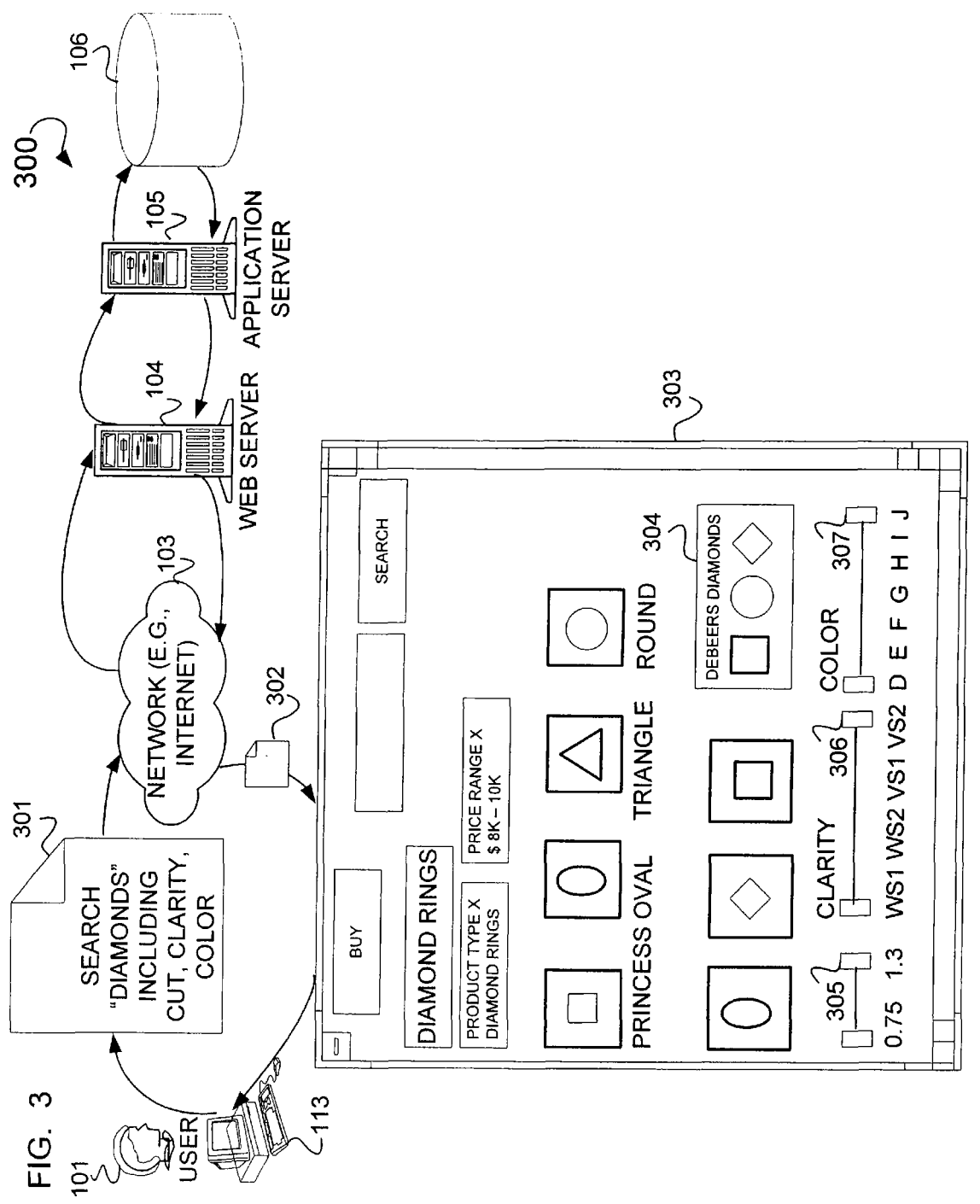
FIG. 3 is a diagram of a system illustrating a content request and an optimized web page provided in response to this content request, according to an example embodiment.

FIG. 3 is a diagram of an example system 300 illustrating a content request 301 and an optimized web page 302 provided in response to this content request. Shown is a user 101 who, using a computer system 113, generates a content request 301. Contained in this content request 301 is a search query for diamonds, including a request for information regarding the cut, color, and clarity of diamonds. This content request 301 is sent over a network 103 ultimately to an application server 105 where, as previously illustrated, this content request 301 is parsed, and screen objects and widgets retrieved form the content database 106. In response to this content request 301, an optimized web page 302 is provided to the user 101 by, for example, the application server 105, which transmits this optimized web page 302 over a network 103. This optimized web page 302 may be viewed through a GUI 303. Displayed in this GUI 303 is an advertisement field 304 (e.g., a JPEG image) that illustrates Debeers™ Diamonds. Also illustrated is a screen objects 305 that provides a sliding scale for requesting certain diamond carat weights, a screen objects 306, in the form of a sliding scale, that allows a user 101 to request certain types of clarity grades, and a screen objects 307 in the form of a sliding scale that allows the user 101 to make requests regarding the color of a particular diamond. In contrast to the non-optimized web page 202, the optimized web page 302 provides specific screen objects or widgets in response to a content request 301. In some cases, the screen objects or widgets (e.g., 305-307) are placed into the optimized web page 302 based upon certain types of dynamic business rules or logic, where these dynamic business rules or logic are based upon certain types of AI algorithms. These screen objects or widgets (e.g., Nos. 305-307) may be placed into a web page (e.g., optimized web page 202) based upon certain types of economic criteria such as an ROI value, or some other value. The process for selecting such screen objects or widgets may be more fully illustrated below.

Figure 4:
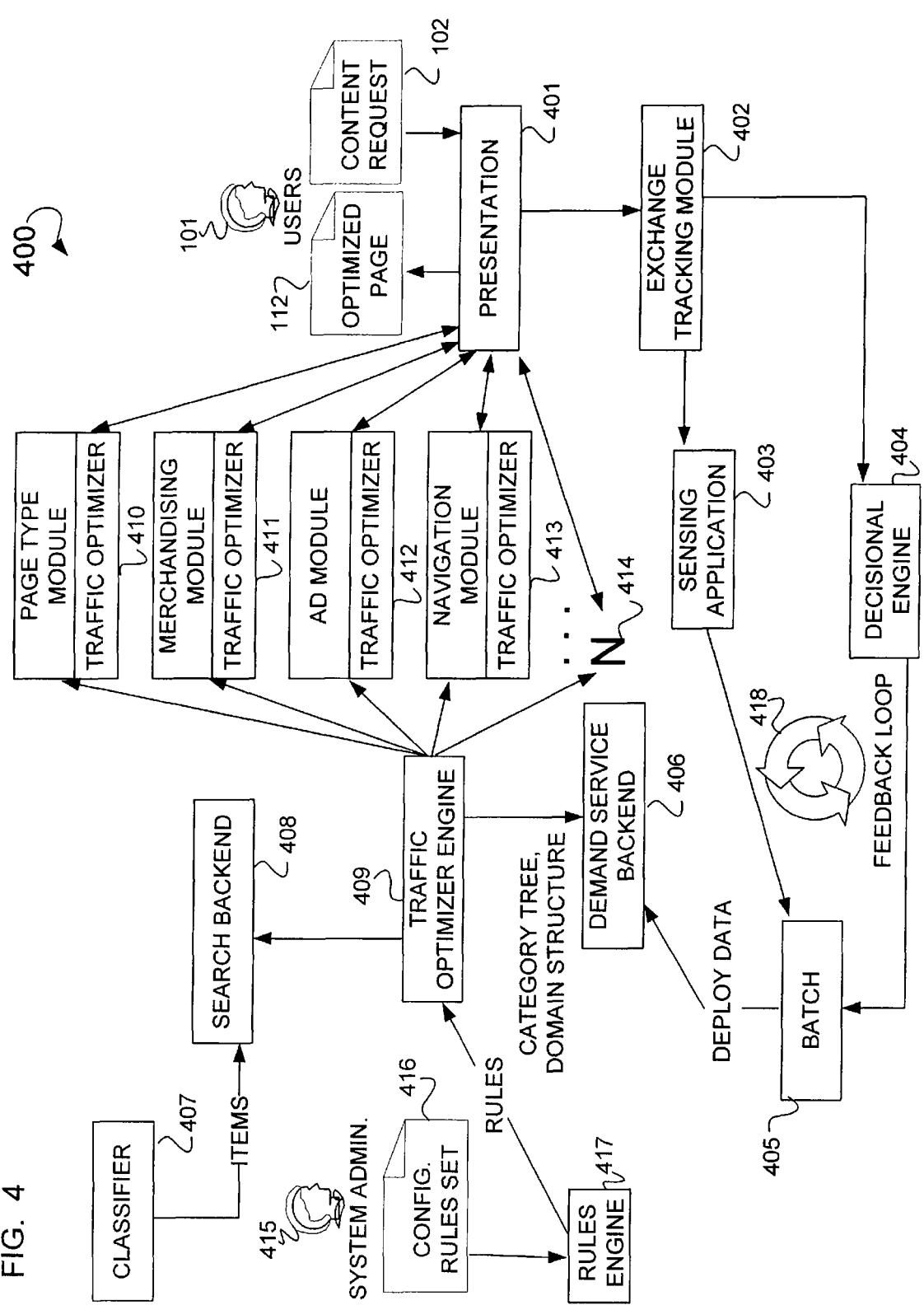
FIG. 4 is a diagram of a system illustrating a system to optimize a web page, according to an example embodiment.

FIG. 4 is a diagram of an example system 400 used to optimize a web page. Shown is a user 101 who makes a content request 102 of the system 400. As a threshold matter, the various modules outlined below (e.g., 401-418) may reside on one or more computer systems including the previously illustrated web server 104 and application server 105. These computer systems may also include database servers. These modules may be implemented in hardware, firmware, and/or software. This content request 102 is processed by a presentation module 401. This presentation module 401, in some cases, parses the content request 102 into its constituent parts. As previously illustrated, this content request may be in the form of, for example, an HTTP request or some other suitable request type commonly used to request data. Once parsed, this content request 102 may, in some cases, be sent to an exchange tracking module 402. This exchange tracking module 402 may, in some cases, track network traffic between, for example, a user 101 and the system 400 as it occurs over a network 103. During the course of the operation of the exchange tracking module 402, a sensing application 403 may generate tables of screen objects or widgets. These tables of screen objects or widgets may contain fields that illustrate a particular optimization module that generated the screen objects. Further contained in these tables is data illustrating the underlying AI algorithm that was used to generate (e.g., choose) this particular screen objects for use in a particular web page. Also illustrated in these tables is a counter or tracking field to count or track the number of times the screen objects has been chosen by users of the system 400. Additionally, a decisional engine 404 may generate a network representation of the decisional steps or decisional logic used to determine which traffic authorization modules (e.g., 410-414, collectively referenced as the traffic optimizer module set) should be used in the optimization of a web page. As may be illustrated more fully below, this decisional engine 404 may, for example, maintain a decision tree wherein the selection of a node in the decision tree may be determined based upon the execution of one or more AI algorithms. In some embodiments, once the sensing application 403 and decisional engine 404 have been executed, a batch module 405 may be implemented. The batch module 405 receives both the table or tables generated by the sensing application 403 and optimized decisions relating to which traffic authorization modules (e.g., 410-414) to use based upon the execution the decision tree 404.

In one embodiment, the example system 400 may be thought of as a series of modules executed through a feedback loop, such as a feedback loop 418. The data provided to this feedback loop 418 in the form of a content request serves as a training data set for training particular types of AI algorithms. Specifically, this data set may then be used by a plurality of AI algorithms for the purpose of making predictions as to which objects or screen widgets would be best suited for the purposes of optimizing a web page. The concept of "best suited" may be based upon such things as ROI values or other type of values. This feedback loop 418 may be more fully illustrated below. Once the batch module 405 is executed, a histogram is generated that contains aggregated data that outlines which traffic optimization modules are to be used in response to the content request 102. Further, contained within this histogram is a description of the various screen objects or widgets that may be used during the course of the generation of an optimized web page 112. In some embodiments, an individual or even a series of histograms is then stored in a demand service backend 406. This demand service backend 406 may be any one of a number of commercially available database applications and may even include the previously illustrated On Line Analytical Processing (OLAP) database and/or a relational or object relational database.

Some embodiments may include the histogram, or series of histograms, being stored into the demand services backend 406, for use by a traffic optimizer engine 409. This traffic optimizer engine 409, in some cases, makes a data request of the demand service backend 406 seeking to request the histograms that are stored within the demand services backend 406. This request may be in the form of an Structured Query Language (SQL) query, an Multidimensional Expression (MDX) query, or some other suitable type of query written in a query request language. Additionally, the traffic optimizer engine 409 may make a request of a search backend 408 wherein the search backend 408 contains a variety of data relating to items that may be, for example, offered for sale by the website supported by this system 400.

In some embodiments, the data stored into the search backend 408 may also be optimized using a classifier 407, where a classifier 407 uses any one of a number AI algorithms to optimize the various items for sale and categories relating to items for sale. Further, the traffic optimizer engine 409 may be governed by a configure rule set 416 generated by, for example, a system administrator 415 where this configure rule set 416 is provided to rules engine 417. In one embodiment, the rules engine 417 dictates to this traffic optimizer engine 409 certain rules that cannot be violated through utilization of various AI algorithms. Put another way, the rules engine 417 dictates to the traffic optimizer engine 409 certain ways in which an optimized web page may not be optimized. These rules provided by the rules engine 417 to the traffic optimizer engine 409 may relate to, for example, certain advertisements that must be paired with a particular web page or may seek to enforce other types of contractual arrangements that a particular business implementing, or otherwise using this system, must adhere to in the providing of an optimized web page 112.

Once a traffic optimizer engine 409 retrieves a histogram containing aggregated data relating to screen objects or widgets, it provide this data set (e.g., the item data set and the screen objects data set) to one or more traffic optimizer modules. These traffic optimizer modules may seek to optimize certain portions or aspects of a web page 112. For example, a page type module 410 may seek to optimize the type of page that is presented to the user for viewing. Further, a merchandising module 411 may seek to optimize (e.g., to optimize the contents of merchandising placements) a particular web page, such as 112, based upon the type of screen objects or widgets that are actually presented on that page. For example, the screen objects or widgets 305 through 307 may result from an application of a merchandising module 411. Further, an ad module 412 seeks to optimize for the purposes of advertisements. For example, the advertising object 304 may reflect this application of this ad module 412, where advertisements related to a search query are placed on an optimized web page such as 302. Further, a navigation module 413 may seek to insert certain links into an optimized web page for the purposes of allowing navigation to related web pages. As with the decisional engine 412, each of these various traffic optimizer modules (e.g., 410-414) may use various AI algorithms in combination with, for example, certain decisional logic as embodied in a decision tree. In some embodiments, each of the traffic optimizer modules (e.g., 410-414) may optimize specific screen objects or widgets related to their particular illustrated area or subject matter. For example, the page type optimizer 410 may only optimize certain screen objects or widgets in the form of, for example, various available CSS that may be used to optimize a page, whereas the ad module 412 may seek to only optimize certain screen objects or widgets in the form of advertisements.

Once the various traffic optimizer modules have been selected by the traffic optimizer engine 409 and have, in turn, optimized a web page (e.g., 112, or 302) based upon their particular area of application (e.g., page type optimization, merchandising optimization, ad optimization, navigation optimization), a page optimization instruction set is passed to the presentation module 401 wherein the presentation module 401 assembles the various optimized screen objects or widgets and presents them in the form of an optimized web page 112. The various functionalities of the above-illustrated modules (e.g., 401-418) are more fully outlined below.

In some embodiments, a method may optimize a web page using one or more Artificial Intelligence (AI) algorithms, wherein the one or more AI algorithms are optimized based upon a predefined criteria including ROI, and presenting the web page to a user to be viewed. As may be more fully illustrated below, these AI algorithms may be deterministic or non-deterministic in nature, and may be used by decisional engine 404, batch module 405, traffic optimizer engine 409, and/or any one of the traffic optimizer modules (e.g., 410-414). The predefined criteria for optimization may be ROI, but may also include user-segment base success or some type of dynamic measure of success. As previously illustrated, screen objects or widgets may be optimized, as may the layout of a web page and the items (e.g., items for sale) displayed on the web page.

An Architectural Description

Figure 5:
FIG. 5 is a diagram of a feedback loop illustrating the various modules that are executed during the execution of the system, according to an example embodiment.

FIG. 5 is a diagram of an example feedback loop 418 illustrating the various modules that are executed during the execution of the feedback loop 418. Illustrated is a start position 501 illustrating the execution of various collection modules (e.g., 402-404). Further, a second position of a feedback loop, represented by 502, illustrates various analysis or analysis modules (e.g., 405-409). Next, a position 503 illustrates various deploy modules (e.g., 410-414 and 417). Further, a fourth position 504 illustrates the various modules used for execution and display (e.g., presentation module 401). As previously illustrated, this feedback loop takes in a training data set in the form of a content request 102 and uses this training data set to train various AI algorithms. Once trained, these AI algorithms may then optimize this content request, and the options contained therein, for the purposes of making predictions about what an optimized web page, such as, for example, optimized web page 112 may look like (e.g., what screen objects or widgets it may contain that may provide for the best ROI value).

Capturing and Presenting Data

In some embodiments, a client-based browser application using a GUI, such as GUI 303, is implemented, whereas in some other embodiments, a command line interface is implemented. Some well-known client-based browser applications include NETSCAPE™, INTERNET EXPLORER™, MOZILLA FIREFOX™, OPERA™, or some other suitable browser application. Common to these browser applications is the ability to use HTTP or Secured Hyper-Text Transfer Protocol (HTTPS) to get, upload (e.g., PUT), or delete web pages and interpret these web pages, which are written in a Hyper-Text Markup Language (HTML) and/or an XML. HTTP and HTTPS are well known in the art, as are HTML and XML. HTTP and HTTPS are used in conjunction with a TCP/IP protocol as illustrated in the OSI model, or the TCP protocol stack model, both of which are well known in the art. The practical purpose of the client-based browser application is to enable a user to interact with the application through the display of plain text, and/or interactive, dynamic functionality in the form of page links, buttons, text boxes, scroll down bars, widgets, or other objects (collectively objects or widgets) contained on one or more web pages (e.g., optimized web pages 302 and 112) constructed using the aforementioned HTML and/or XML. Further, these object and widgets may be used to execute certain code components or modules (e.g., modules written as Java Enterprise Beans (EJB), Component Object Model (COM), or Distributed Component Object Model (DCOM) or some other suitable module type used to, for example, make search queries or to execute other functionality.

Figure 6:
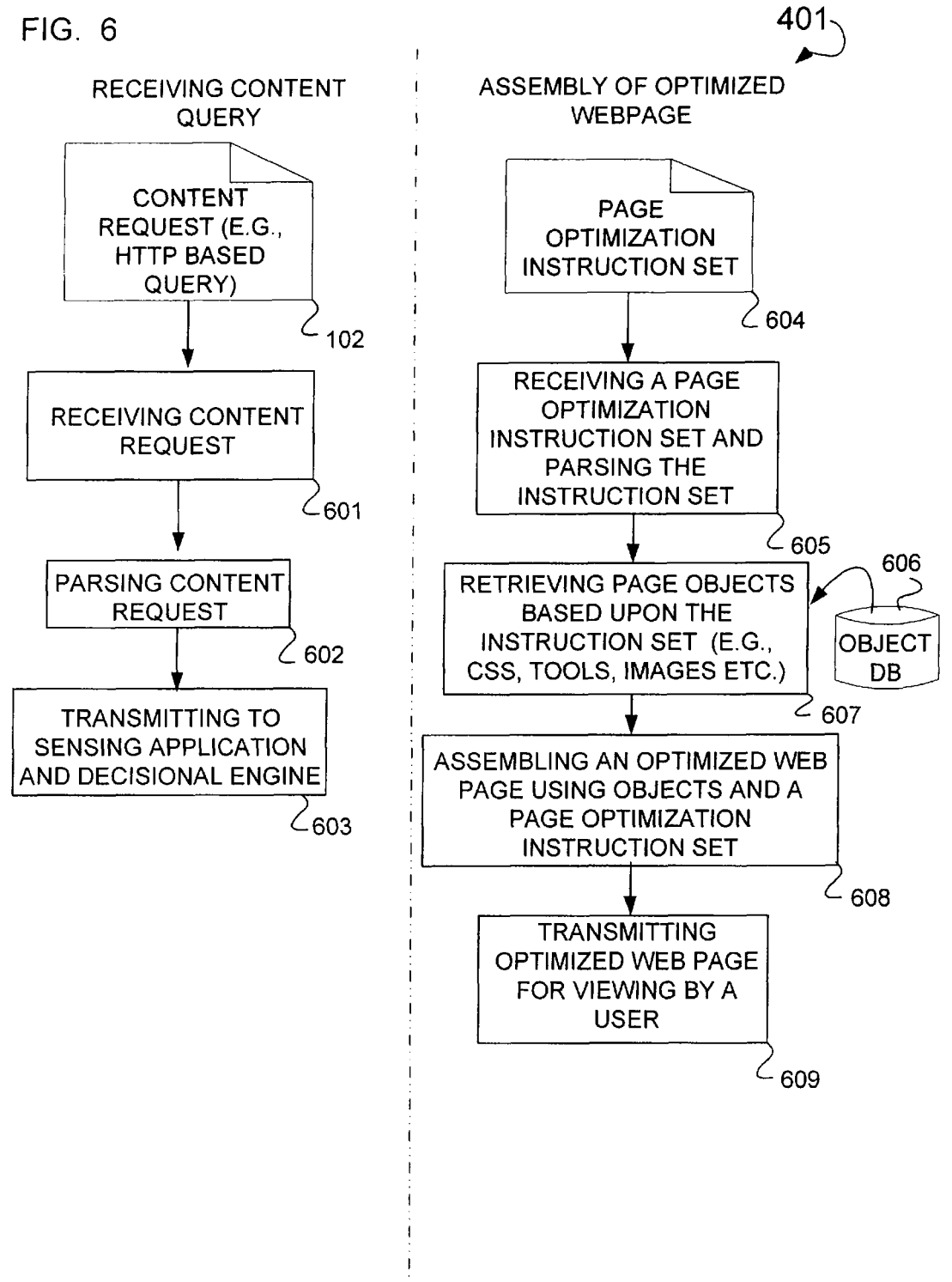
FIG. 6 is a dual stream flow chart of a method used to implement a presentation operation, according to an example embodiment.

FIG. 6 is a dual stream flow chart of an example method used to implement a presentation module 401 to present and assemble a web page. Illustrated is a first stream titled "Receiving Content Query" and a second stream titled "Assembly of Optimized webpage." With regard to the first stream, a content request 102 is received by an operation 601 wherein the operation 601 is able to receive, for example, HTTP queries. Once received, the operation 601 passes this content request 102 to an operation 602 that parses the content request 102 into its constituent parts based upon some grammar that is known in the art. Once parsed, an operation 603 is executed that transmits this parsed content request to, for example, the sensing application 403 and decisional engine 404. With regard to the second stream of this dual stream flow chart, a page optimization instruction set 604 is received by the presentation module 401 from one or more of the traffic optimizer modules (e.g., 410-414). Once received, the operation 605 is executed that not only receives this page optimization instruction set 604 but parses this instruction set into its various instructions based upon some predefined grammar. Once parsed, an operation 607 is executed that, based upon the parsed instructions, retrieves page objects or widgets based upon the instructions contained in the page optimization instruction set 604. These various screen objects or widgets are retrieved from an object database 606. The operation 608 is then executed which, in turn, assembles these objects or widgets into an optimized web page, such as, for example, optimized web page 112 or 302. Once assembled, an operation 609 is executed that transmits this optimized web page to a viewer or user such as user 101 for viewing on a computer system 113 via a graphical user interface such as GUI 303.

Some embodiments may include a user selection of screen objects using an input device (e.g., a mouse) to select and send an HTTP-based query (e.g., a content request) to a website. This content request may have the form of "http://antiques.acme.com/" or, for example, "http://books.acme.com/". More sophisticated content requests may also be made wherein not only are web pages requested, but specific objects on web pages are requested, and the functionality associated therewith. The following are examples of these more sophisticated queries:

http://books.listings.acme.com/Accessories_Address-Bookfromdatabase1
http://books.listings.ebay.com/Accessories_Address-Book2fromdatabase2

With respect to these more sophisticated content requests, in some embodiments, objects or widgets that are a part of these requests (e.g., Accessories_Address-Book and Accessories_Address-Book2) are parsed and tracked based upon the number of times they are selected and the logic used (e.g., AI algorithms) to generate the web page containing the objects or widgets.

FIG. 7 is a flow chart of an example method 401. Illustrated is an operation 701 that receives a parsed content request. Also shown is an optional operation 703 that receives a page optimization instruction set such as page optimization instruction set 604. Once operations 701 and 703 receive their respective data sets, these data sets are passed to an operation 702 that transmits the parsed content and page optimization instruction set to, for example, a sensing application 403 and/or decisional engine 404.

FIG. 8 is a flowchart illustrating an example method 403. Illustrated is an operation 801 that listens to a traffic exchange between a user (e.g., 101) and a website (e.g., a site run by web server 104 and application server 105), wherein the traffic exchange relates to a specific transaction data in the form of, for example, the sale or purchase of a good or service. While listening to this exchange, an operation 802 is executed that captures certain content request data wherein, for example, this content request data relates to certain HTTP based requests or queries made by, for example, a user 101. In some embodiments, user response data is listened to and processed in addition to, or, in lieu of, the content request data. This user response data may be, for example, data (e.g., HTTP based requests) generated in response to certain types of content displayed to a user. Once this content request data is captured, and stored into a sensing database 803, it may be periodically accessed by, for example, a module 405 illustrated below. An example of how this content request data is captured is provided in FIG. 9.

Some embodiments may include a method that further comprises listening to a traffic exchange between the user and a website, wherein the traffic exchange includes content request data relating to a specific transaction between the user and the website and capturing the content request data and storing into a data structure. The model 801 may conduct this listening, while the operation 802 may actually capture what is listened to by the operation 801. This listening may be over a network connection including an Ethernet connection or some other suitable network connection. Further, the capturing of the content request may be by way of a recording application that simply records content requests by a user such as user 101 and records such content request data.

FIG. 9 is a diagram of the results of an example implementation of operation 802. Shown is a content request 102 containing various types of formatted text wherein the formatted text is formatted using, for example, HTML. Illustrated are various HTML tags used to denote links or other types of screen objects or widgets, wherein the links are to content contained on other web pages. While the example text provided in content request 102 is HTML, it is clear that other types of tagging, markup languages could be used, such as, for example, XML or even, for example, HTML and/or XML used in conjunction with JavaScript (e.g., collectively referenced as AJAX). This content request 102 is parsed and then stored into one or more data structures (e.g., a table, array, tree, hash table etc.) as, for example, content request data, or even user response data. Shown is a table 901 containing an operation field 902 illustrating the operation that was used to generate the particular screen objects, and an algorithm field 903 illustrating the particular algorithm that was used to optimize the particular screen objects wherein this optimization was carried out by the corresponding operation. Further, a content request field 904 is illustrated that actually contains the particular screen objects used by a user, and a times-used or tracking field 905 that references the number of times the screen objects has actually been executed by, for example, user 101. The values contained in the module field 902 correspond to the previously illustrated traffic optimizer modules (e.g., 410-414); whereas the algorithms field illustrates various AI algorithms that could be used to optimize the various screen objects or widgets and/or optimize the selection of these various modules.

In some embodiments, an additional field of data (not pictured) for each tuple entry is maintained in the table 901 that contains data providing a context within which the content request appearing in content request field 904 has been accessed. This context field may reference other pages (e.g., containing a link to them) that link to the web page upon which the content request 102 may appear. Moreover, this context field may include additional object, widgets, layout and other information present on web page upon which the content request 102 appeared.

Some embodiments may include a method wherein the table 901 or other suitable data structure contains data including a content request data relating to a traffic optimizer module used to generate the content request data, a name of an algorithm used to optimize the content request data, the content request data itself, and a value reflecting number of times the content request data has been selected by the user. In some embodiments, some other suitable data structure is used, including a tree, hash table, heap, or array.

Optimizing Presentation Decisions

FIG. 10 is a flowchart illustrating an example method to implement a decisional engine module 404 to select members of a selected traffic optimizer module set made up of various modules 410-414. Shown is an operation 1001 that receives parsed content and optionally a page optimization instruction set 604. Once received, the operation 1002 is executed that updates a decision tree (e.g., updates with tracking data relating to the selections, search queries of a user of a web page), and the nodes contained therein, to reflect certain search queries. Once this decision tree is updated, it is stored into a decision tree data store 1003 for future use. In some cases, some other data structure may be used to lieu of a decision tree such as, for example, a bayesian network, or some other suitable data structure. Next, an operation 1004 is executed that makes procedure calls to an AI library 1005 wherein these calls are made to this library for the purpose of generating an optimization analysis for each of the AI algorithms, or combination of AI algorithms, contained within the AI library. Each of these AI algorithms seeks to optimize the parsed content as associated with members of the traffic optimizer module set. This parsed content associated with a member of the traffic optimizer module set is represented as a node in the decision tree. These nodes may be organized such that the shortest path to the highest ROI value is created. Once the operation 1004 makes a procedure call to the AI library 1005 and retrieves the decision tree from the decision tree data store 1003, a decisional operation 1006 is executed that determines whether or not the highest ROI value has been returned as a result of the execution of a particular AI algorithm contained in the AI library 1005. If this decisional operation 1006 evaluates to "false" (e.g., no), then the highest value (e.g., an ROI value) has not been returned and the operation 1004 is again executed to seek an additional AI algorithm, or combination of AI algorithms. If, on the other hand, the decisional operation 1006 evaluates to "true" (e.g., yes), an operation 1007 is executed that traverses the decision tree, and selects an optimal traffic optimizer module set, wherein the set contains that traffic optimizer module or combination of traffic optimizer modules (e.g., 410-414) that may best be suited for the purposes of providing the highest value, for example, an ROI value. Once this set is determined, an operation 1008 is implemented that transmits this optimal traffic optimizer module set.

In some embodiments, an AI library 1005 is implemented so as to allow for a variety of optimization techniques and algorithms implementing such techniques. This AI library 1005 allows for a dynamic approach to the business rules implementing a website such that web pages, and the objects or widgets displayed thereon, may be presented based upon the criteria including ROI, the orientation of the particular site (e.g., a Japanese, American, or German site), the query (e.g., IPod™, Harry Potter™), user segment (e.g., buyer, seller, etc.), category (e.g., consumer electronics, etc.), previous page viewed by user, referrer (e.g., from GOOGLE™, YAHOO™), a user's session behavior, results context (e.g., number of results, primary category, etc.), time of day, day of week, season of year, or some other suitable criteria.

The AI algorithms contained in this AI library 1005 may, in an example embodiment, fall into one of two categories of AI algorithms: deterministic or stochastic. In order to understand these two categories as they relate to the issue of users purchasing good or services off a website, it should be understood that a wholly deterministic world may be capable of analysis through one or more deterministic algorithms. However, where there exist actions of agents (e.g., users of the website) that do not lend themselves to prediction, then stochastic algorithms may need to be implemented by themselves, or, in combination with other deterministic, or stochastic algorithms. One distinguishing feature of stochastic algorithms, as compared to deterministic algorithms, is that the former may use some sort of nondeterministic feature such as random number generation, or random node selection (see, e.g., genetic algorithms) in its optimization analysis, while the later avoids such random, non-deterministic features. This random number generation may allow for the avoidance of pitfalls such as slavish adherence to predictability criteria during the optimization process. Some embodiments may include the use of deterministic or stochastic algorithms in combination (see e.g., genetic fuzzy algorithms).

Some example embodiments may include any number of deterministic algorithms implemented in the AI library 1005, including case-based reasoning, bayesian networks (including hidden markov models), neural networks, or fuzzy systems. The bayesian networks may include: machine learning algorithms including—supervised learning, unsupervised learning, semi-supervised learning, reinforcement learning, transduction, learning to learn algorithms, or some other suitable bayesian network. The neural networks may include: kohonen self-organizing network, recurrent networks, simple recurrent networks, Hopfield networks, stochastic neural networks, boltzmann machines, modular neural networks, committee of machines, Associative Neural Network (ASNN), holographic associative memory, instantaneously trained networks, spiking neural networks, dynamic neural networks, cascading neural networks, neuro-fuzzy networks, or some other suitable neural network.

In some embodiments, any number of stochastic algorithms may be implemented including: genetic algorithms, ant algorithms, tabu search algorithms, or monte carlo algorithms (e.g., simulated annealing). Common to these algorithms is the use of randomness (e.g., randomly generated numbers) to avoid the problem of being unduly wedded to a local minima or maxima.

The decision to use one AI algorithm versus another may be based upon the relative ROI of optimizing web pages using one set of modules as compared to another set of modules. For example, while a projected ROI using a bayesian network to optimize a set of web pages may be $75,000, the projected ROI, using a fuzzy genetic algorithm may be $80,000, assuming equal costs. In some embodiments, the various AI algorithms are used to optimize the individual nodes of a decision tree.

Some embodiments may include a decision tree generated from or optimized by one or more of the above illustrated AI algorithms applied separately or in combination. A decision tree, for example, allows for the modeling of decisions and their possible consequences. For example, if a first combination of modules (e.g., the merchandising module 411 and the ad module 412) allows for a larger ROI relative to cost than a second combination of modules (e.g., navigation module 413 and page type optimizer module 410), then the first combination may be the preferred combination to implement.

In some embodiments, the method 404 further generates a decision tree at operation 1002 to determine which traffic optimizer modules are best suited to optimize the web page, and operations 1004-1006 to optimize the decision tree using the one or more AI algorithms to determine an selected traffic optimizer module set, an operation 1007 to select the traffic optimizer module set, and an operation 1008 to transmit the selected traffic optimizer module set. As previously illustrated, these AI algorithms may be deterministic or non-deterministic algorithms.

FIG. 11 is a network diagram of an example decision tree that may result from the execution of the operation 1006. In general, this decision tree may reflect the comparative costs place one set of object and widget on a web page as opposed to another set of objects and widgets. Illustrated is a decision tree with the following nodes:

"Z" 1101 is an initial cost of investment in the building of a web page, say $20,000 covering, for example, cost associated with serving data, serving a UI, and facilitating the scaling of usage, and the like;

"A" 1102 is a first possible ROI over some period of time (e.g., two weeks) in the amount of $100,000 using optimized web pages generated by way of the merchandising module 411 used in combination with the ad module 412;

"B" 1105 is a second possible ROI over some period of time (e.g., two weeks) in the amount of $75,000 using optimized web pages generated by way of the navigation module 413 used in combination with the page type module 410;

"Y" 1103 is a probability value, say 60%, that the ROI for node "A" 1102 occur; "C" 1104 is a probability value, say 40%, that the ROI for node "A" 1102 occur;

"E" 1106 is a probability value, say 30%, that the ROI for node "B" 1105 occur;

Given the above nodes and associated values, it is clear that by selecting node "A" 1102 that one is provided a high probability of a greater ROI than by selecting node "B" 1105. Assume, however, that through applying an AI algorithm to the decision tree, a new node, call it "G" 1107 is generated, wherein "G" 1107 represents a probability value, say 70%, that the ROI for node "B" 1105 may occur. Given the new node "G" 1107, the combination of optimizing the navigation module 413 with the page type module 410 may be an optimal decision, relative to choosing node "A" 1102. In one example embodiment, a bayesian network is used to predict the probability for a ROI given some combination of modules (e.g., modules 410-414).

Some embodiments may include generating a decision tree who nodes reflect the comparative ROI of using individual modules or even a plurality of modules (e.g., modules 410-414). For example, rather than building a decision tree based upon ROI as reflected in the combining of two modules, and comparing this ROI against the ROI for two other modules that have been combined, a decision tree may be built that reflects the ROI based upon one module, a module that is then compared to another module and its associated ROI. Other comparisons and combinations are also possible including, for example, basing ROI on the combination of more than two modules and comparing this ROI against the ROI for one or more than two modules.

Example embodiments may also include building a decision tree that compares the ROI of using one or more of the modules (e.g., modules 410-414) to the ROI of letting a third party provide the services otherwise provided by one or more of the modules. For example, rather than using the ad module 412 as a basis upon which to determine the ROI using this module by itself or in combination with other modules, an ROI for advertising may be used upon using data provided by a third party advertiser who, for example, provides the content to be placed within the available space on a web page. In some embodiments, however, these services may be provided through the module (e.g., module 412).

Figures 12, 13:
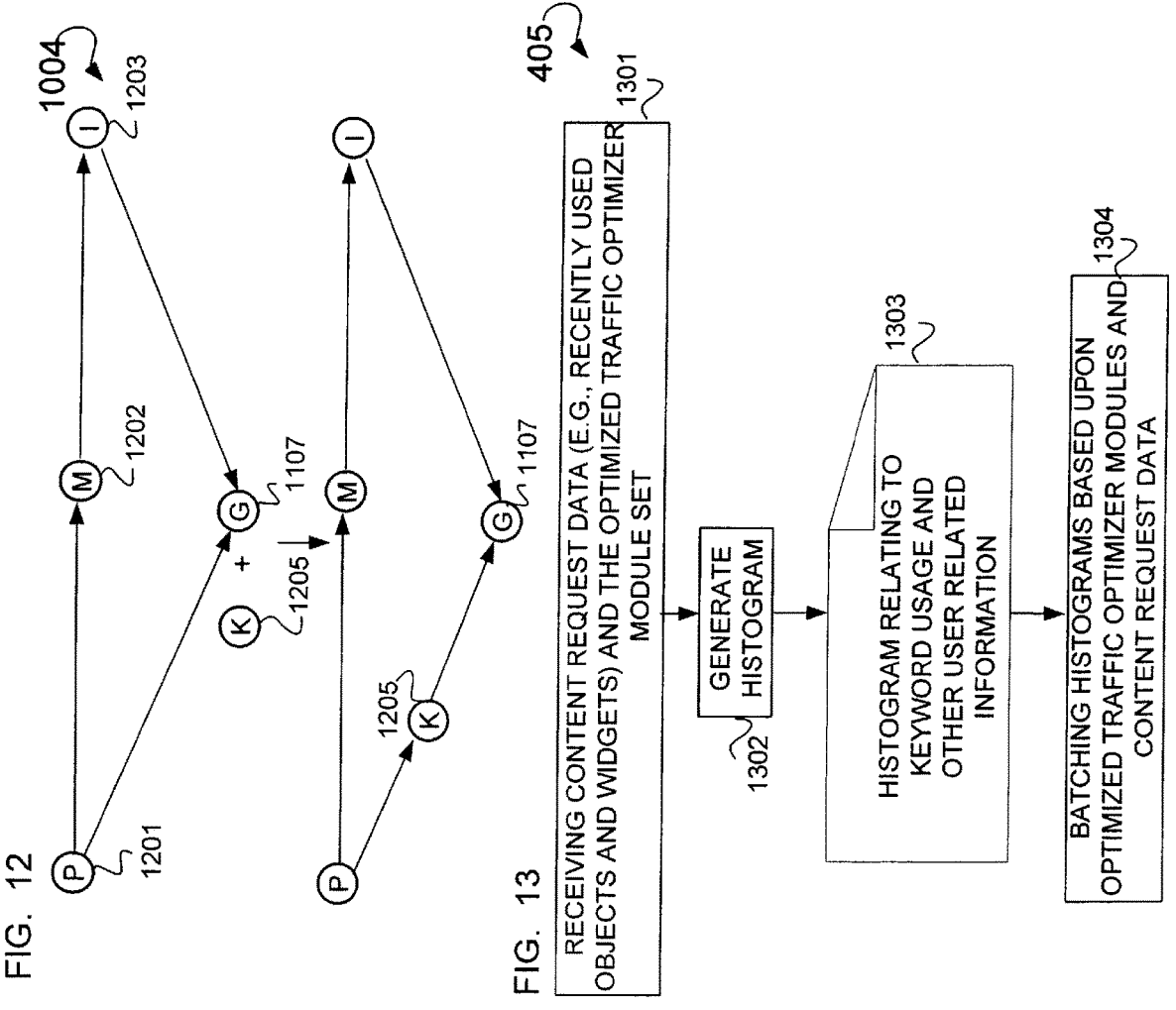
FIG. 12 is a network diagram illustrating a bayesian network that may result from the execution of an operation that makes procedure calls to an AI library, wherein these calls are made to this library for the purposes of generating an optimization analysis for each of the AI algorithms, or combination of AI algorithms, contained within the AI library, according to an example embodiment.
FIG. 13 is a flowchart illustrating a method used to implement a batch operation, according to an example embodiment.

FIG. 12 is a network diagram illustrating an example bayesian network that may result from the execution of the operation 1004. This bayesian network may have the following nodes:

"P" 1201 is a probability value of 10% that optimized web pages generated using a navigation module 413 in combination with the page type module 410 may result in a ROI of greater than or equal to $75,000;

"M" 1202 is a probability value of 10% that optimized web pages generated using a navigation module 413 in combination with a merchandising module 411 may result in a ROI of greater than or equal to $75,000;

"I" 1203 is a probability value of 10% that optimized web pages generated using a navigation module 413 in combination with an ad module may result in a ROI of greater than or equal to $75,000;

"G" 1107 is a probability value of 10% that optimized web pages generated using the navigation module 413 by itself may result in a ROI of greater than or equal to $75,000;

Given the above nodes and associated values, one result of selecting nodes "P" 1201, "M" 1202, "I" 1203, and "G" 1107 (e.g., combining probability values arising from the use of each of the referenced modules to generate a web page) is that there may be a 40% chance that an ROI of $75,000 may occur. Assume, however, that new data represented by a node "K" 1205 is added into the network, wherein "K" 1205 is a probability value of 10% that, by optimizing a web page using the navigation module 413 used in combination with the page type module 410, an ROI of $75,000 may occur. By inserting "K" 1205 into the path between "P" 1201 and "G", there may exist a 60% probability value that the ROI may be $75,000.

In addition to bayesian networks, other types of AI algorithms may be available as a part of the AI library 1005 to optimize nodes of a decision tree built through operation 1004. For example, a fuzzy genetic algorithm may be applied that can be understood as incorporating the features of both a deterministic and stochastic algorithm. Applied in the present context, a genetic algorithm could be used to optimize the set of modules (e.g., 410-414) through selecting and combining successful modules (e.g., those with a high ROI value, relative to cost) using principles of crossover and mutation that incorporate certain concepts of randomness in the selection of these modules. This process of crossover and mutation may be repeated until diversity is established, based upon some predefined criteria. Once diversity is established, then a fuzzy associative matrix may be generated illustrating the success percentages for each of the combinations of modules based upon a particular data set (e.g., the ROI value over a period of time). An example fuzzy associative matrix is provided below:

This table may then be used to generate the decisional logic of each node (e.g., "B" 1105) for in a decision tree such that, for example:

If the Merchandising Module/Page type Module is to be optimized and the optimization may more than likely result in the ROI 20%-80% of the time, then implement;

If the Merchandising Module/Page type Module is to be optimized and the optimization may result 10%-20% of the time, but may not result 10%-20% of the time in the ROI value, then implement only if most likely not a higher percentage for attaining an ROI value.

In some embodiments, the values in the above matrix are inserted into a data structure such as an array, tree (e.g., a binary search tree, red-black tree), list, stack or query, wherein the type of data structure used may be dictated by the efficiency of searching the data structure for a given data set size. Further, a table may be generated for every combination of modules created using the genetic algorithm.

Generating and Storing a Histogram

FIG. 13 is a flowchart illustrating an example module 405 to generate a histogram. Shown is an operation 1301 to receive current data in the form of, for example, recently used objects or widgets contained in, for example, the previously illustrated table 901. Additionally received is an optimized module decision information set from, for example, the decisional module 404. Once the operation 1301 receives this information, an operation 1302 is executed wherein this operation 1302 generates a histogram 1303 containing user profile information relating to objects and widget selected (e.g., the content request data), and the selected traffic optimizer module set information received from the decisional engine 404. This histogram 1303 is then, in some cases, batched with other histograms by an operation 1304 such that batches of related or unrelated histograms are aggregated together and ultimately sent to, for example, a demand services backend 406. This operation 1304 may use one or more logical operators (e.g., union, intersection, or other suitable logical operators) to combine two or more histograms to form a batch of histograms. Some embodiments may include a method that further includes the operation 1301 to receive the content request data and a selected traffic optimizer module set, the operation 1302 (e.g., the AI engine) to optimize the content request data using the one or more AI algorithms, and to create a histogram relating to keyword usage, wherein the histogram contains the optimized content request data and a member of

| Merchandising Module/Page type Module for a certain value (e.g., an ROI of $75,000) | Will Not Occur (10%-20%) | Will Occur (10%-20%) | Most Likely (20%-80%) |
|---|---|---|---|
| Will Not Occur (10%-20%) | Implement, only if most likely not a higher percentage for attaining an ROI value | Implement, only if most likely not a higher percentage for attaining an ROI value | Implement |
| Will Occur (10%-20%) | Choose another combination of modules from another matrix | Implement, only if most likely not a higher percentage for attaining an ROI value | Implement, only if most likely result with same combination of modules not higher |
| Most Likely (20%-80%) | Implement, only if most likely result with same combination of modules not higher | Implement, only if most likely result with same combination of modules not higher | Implement | the optimal traffic optimizer module set. As illustrated elsewhere, this AI engine may use both deterministic and non-deterministic algorithms.

In some embodiments, the batching of histograms may result in a statistical view (e.g., a data distribution for past performance) of some set of persons (e.g., buyers) and their habits. For example, the batch of histograms may reflect the percentage of persons who purchased a particular item, given a certain number of advertisements appearing on a web page selling the item such that if two ads appear then there is a 33% chance of making a sale, while if four ads appear then there is a 66% chance of making a sale. And again, this statistical view may reflect, for example, a statistical relationship between searches performed in a certain category of items of the web page, and the probability for making a sale.

A further example of how batches of histograms may be used is in the case where histograms are combined and conclusions drawn based upon this combination. A first histogram containing data in the form of the number of times a set of key words have been used over a period of time could be compared to a second histogram containing data relating to sales of a particular item over the same time period. These two histograms may be combine such that certain conclusions could be drawn regarding the relationship between the data contained in the two histograms. Through knowing the probability of making a sale, or even more broadly an ROI value, the histogram or batch of histograms can be used by, for example, the traffic optimizer engine 409 and the various traffic optimizer modules 410-414 to determine how the space (e.g., the real estate) on a web page may be divided up or organized to facilitate the highest ROI relative to other ways of organizing the web page.

FIG. 14 is a diagram of an example histogram 1303 illustrating a number of data entries, with each field for each of the data entries delimited by a tab character 1401. In some embodiments, some other suitable delimiting character may be used including, for example, a colon, semicolon, or even a space character. Further, shown is a first data entry 1402 containing a page type field with a value of 10 delimited by a tab character 1401, an impressions (IMP) field containing a value 600436 delimited by another tab delimiter 1401, a page views (VI) field containing a value of 478119, also delimited by a tab character 1401, and a further bid field 1401 delimited by a tab character 1401 containing the value 65880. Additional data entries 1403 and 1404 are also illustrated.

FIG. 15 is a diagram of an example histogram 1303 wherein the histogram 1303 is written using some type of tagging language such as XML. Shown is a page type tag 1501 denoting a page type, an IMP field 1502, a VI field 1503, and a bids field 1504. In some embodiments the histogram 1303 may be written in XML, some other suitable tagging language, or, as previously illustrated, may be written using certain types of delimiters or other suitable ways of distinguishing fields of data relating to the usage of screen objects or widgets.

FIG. 16 is a flowchart illustrating an example method used to implement module 406. Illustrated is the operation 1601 that receives keyword information relating to a specific item or product for sale and paging information whereas paging information is, for example, one of the previously illustrated histogram 1303. Once this information is received, an operation 1602 is executed that passes this keyword information to a search algorithm (see e.g., the algorithms outlined in U.S. patent application Ser. No.

11/679,973, incorporated by reference in its entirety herein) to retrieve certain search selections such as, for example, item data, and to combine these search selections with the histograms such as histogram 1303. As previously illustrated, this demand service backend 406 may use certain types of commercially available database applications for programs.

Optimizing and Combining Histograms and Items Data/ Search Results to Generate a User Experience FIG. 17 is a flowchart illustrating an example method used to implement module 409. Illustrated is an operation 1701 that retrieves batch histogram data and various item data to be optimized. This retrieval may occur through using some type of query language such as SQL, MDX, or some other suitable query language. Once retrieved, an operation 1702 is executed that categorizes each histogram based upon the item type (e.g., the type of data processed by one or more of the modules 410-413 including merchandising data related to an item, ad data related to an item, navigation data related to an item etc.) to which it relates. Once categorized, an operation 1703 is executed that filters these various histograms based upon the configuration rule set 416 as provided by the rules engine 417. Once filtered, each histogram and item data is sorted using an operation 1704. This sorting may be based upon prioritizing each histogram and item data set according to the particular traffic optimizer module (e.g., 410-414) that may be able to service the histogram and related item data. Next, an operation 1705 is implemented that optimizes each category of histogram using an AI algorithm such as, for example, a genetic algorithm wherein, for example, the genetic algorithm attempts to optimize each histogram. This implementation of a genetic algorithm may be more fully illustrated below.

Some embodiments may include a method including an operation 1701 for retrieving a batch of histograms and items to be optimized, an operation 1702 for categorizing each histogram of the batch of histograms based upon item type, an operation 1703 for filtering each histogram based upon a configuration rules set, an operation 1704 for sorting the histograms, and an operation 1705 for optimizing each category of histogram using one or more AI algorithm, wherein the optimizing is based upon some predefined criteria including ROI. The sorting of the histograms may be achieved using any one of a number of sorting algorithms.

In some embodiments, the traffic optimizer engine 409 may query the demand services back end 406 using a query language such as SQL, MDX, Data Mining Extensions (DMX), or some other suitable query language. These queries may seek results that optimize combinations of web page and modules, and/or optimal page and module, and object and/or widget combination. This optimization, in some case, may be based upon certain AI algorithm or combination of AI algorithms. An example query for an optimal page and module combination may have the form of:

```
select
    (select page_type, vi, bid, page_views,
        (select module, vi, bid, page_views from module order by vi)
    from page_type order by vi)
from qd where site = 0 and query = ipod
```

This request can be explained in that using performance data for the US site (site 0) and the query "ipod" for each page variant (page_type) returns the associated number of impressions (imp), the number of item pageviews (vi), and the number of bids (bid).

In response to the above query, the demand service backend 406 may provide the following result:

```
Vr:0.1
{
        ,t{
                ,itemsearchresults,81522,287,47043,{
/*page type 'itemsearchresults' generated 81522 item views (vi) and 287 bids (bid), and was
displayed 47043 times*/
                        ,{merch,20000,112,9987}
/* on the page 'itemsearchresults', the merchandising module generated 20000 item views (vi) and
112 bids (bid), and was displayed 9987 times*/
                        ,{ad,10000,0,6578}
/*on the page 'itemsearchresults', the ad module generated 10000 item views (vi) and 0 bids (bid),
and was displayed 6578 times*/
                }
                ,dynamiclanding,39524,176,13868,{
/* page type 'dynamiclanding' generated 39524 item views (vi) and 176 bids (bid), and was
displayed 13868 times*/
                        ,{ merch,11000,103,5499}
/*on the page 'dynamiclanding', the merchandising module generated 11000 item views (vi) and
103 bids (bid), and was displayed 5499 times */
                        ,{ad,20000,0,12008}
/* on the page 'dynamiclanding', the ad module generated 20000 item views (vi) and 0 bids (bid),
and was displayed 12008 times*/
                }
        }
}
```

In addition to making queries regarding a particular optimal page, module, and object and/or widget combination, other types of queries may be made. For example, a query may have the following form:

```
select
    (select page_type, vi, bid, page_views,
        (select module, vi, bid, page_views,
```

-continued

```
            (select variant, vi, bid, page_views from variant order by vi)
        from module order by vi)
    from page_type order by vi)
from qd where site = 0 and query = ipod
```

In response to such a query, the demand services backend 406 may return the following type result:

```
Vr:0.1
{
        ,t{
                ,itemsearchresults,81522,287,47043,{
/* page type 'itemsearchresults' generated 81522 item vi and 287 bids, and was displayed 47043
times*/
                        ,{merch,20000,112,9987
/* on the page 'itemsearchresults', the merchandising module generated 20000 item vi and 112
bids, and was displayed 9987 times*/
                        ,{algoA,15000,72,4765}
/* on the page 'itemsearchresults', the merchandising module variant using algorithm 'algoA'
generated 15000 item vi and 72 bids, and was displayed 4765 times (page_views), 'algoA' may
be one of the previously illustrated AI algorithms */
                        ,{algoB,5000,40,5222}
/* on the page 'itemsearchresults', the merchandising module variant using algorithm 'algoB'
generated 5000 item vi and 40 bids, and was displayed 5222 times, 'algoB' may be one of the
previously illustrated AI algorithms */
                }
                        ,{ad,10000,0,6578}
/* on the page 'itemsearchresults', the ad module generated 10000 item vi and 0 bid, and was
displayed 6578 times*/
                        ,{adA,7500,0,4012}
/* on the page 'itemsearchresults', the ad module variant using ads from ad provider 'adA' generated
7500 item vi and 0 bids, and was displayed 4012 times*/
                        ,{adB,2500,0,2566}
/* on the page 'itemsearchresults', the ad module variant using ads from ad provider 'adB' generated
2500 item vi and 0 bids, and was displayed 2566 times */
                }
        }
                ,dynamiclanding,39524,176,13868,{
/* page type 'dynamiclanding' generated 39524 item vi and 176 bids, and was displayed 13868
times*/
                        ,{merch,11000,103,5499
/* on the page 'dynamiclanding', the merchandising module generated 11000 item vi and 103 bids,
and was displayed 5499 times*/
                        ,{algoA,6000,72,3013}
```

-continued

```
/*on the page 'dynamiclanding', the merchandising module variant using algorithm 'algoA'
generated 6000 item vi and 72 bids, and was displayed 3013 times*/
                        ,{algoB,5000,31,2486}
/* on the page 'dynamiclanding', the merchandising module variant using algorithm 'algoB'
generated 5000 item vi and 31 bids, and was displayed 2486 times */
                }
                ,{ad,20000,0,12008
/* on the page 'dynamiclanding', the ad module generated 20000 item vi and 0 bids, and was
displayed 12008 times*/
                        ,{adA,14000,0,8012}
/* on the page 'dynamiclanding', the ad module variant using ads from ad provider 'adA' generated
14000 item vi and 0 bids, and was displayed 8012 times */
                        ,{adB,6000,0,3996}
/* on the page 'dynamiclanding', the ad module variant using ads from ad provider 'adB' generated
6000 item vi and 0 bids, and was displayed 3996 times */
                }
            }
        }
}
```

Optimizing Modules, Objects or Widgets Used in Generating a User Experience

FIG. 18 is a flowchart illustrating an example method used to implement operation 1705. Shown is an operation 1801 that divides a batch of histograms by optimization classification type such that the histograms are divided according to the module (e.g., modules 410-414) for which they contain data. Next, an operation 1802 is executed that selects histograms for each classification type wherein a classification type refers to, for example, one of the traffic optimizer modules (e.g., 410-414). Once selection occurs, an operation 1803 is executed that combines the various selected histograms based upon such concepts as crossover and/or mutation as are commonly known in the art, and certain histograms with a low score in terms of the number of times that the data within the histogram has been used are ignored (e.g., the concepts of crossover and mutation are not applied to them). The concepts of cross over and mutation may use certain logical operators (e.g., union, intersection or other suitable operators) to combine histograms and the data contained therein. Concepts of crossover and/or mutation are used for the purposes of injecting some type of randomness into the selection process such that the histogram data set generated may not be wholly wedded to some type of preexisting information (e.g., local maximum and minima values). A decisional operation 1804 is then executed that determines whether diversity has been established within a set or batch of histograms. Where decisional operation 1804 evaluates to "true," that diversity has not been established, operation 1803 may be executed again and crossover and/or mutation may be repeated. Where decisional operation 1804 evaluates to "false," an operation 1805 may be executed that transmits the optimized histograms and/or combinations of histograms for use in a traffic optimizer modules (e.g., 410-414). In certain cases, certain histograms or batches of histograms may be considered elite, in that these histograms are commonly used by many users such that they may be contained in an optimized page such as optimized page 112.

Some embodiments may include an operation 1801 for dividing the batch of histograms by optimization classification, wherein optimization classification includes classification by traffic optimizer module type, an operation 1802 for selecting a histogram from the batch of histograms, and operations 1803-1805 for applying an AI algorithm to the histogram to optimize the histogram and transmitting the histogram as an optimized histogram. In some embodiments, these operations 1803-1805 apply a genetic algorithm to optimize the histogram. In some cases, some other suitable algorithm is applied.

Example embodiments may include the use of operation 1705 to develop new functions utilizing a certain combination of histograms such that new relationships between the data contained within the histograms may be revealed. Further, new combinations of histograms may be generated such that such that these combinations may be provided to existing functions such that new relationships between the data contained in the histograms may be revealed. For example, a mapping of keywords to a product may be created based upon some probability value generated using an existing function. Or percentage values supporting a mapping of keywords to category of items for sale might be generated based upon a newly created function that is created specifically for the purpose of this mapping.

Figure 19:
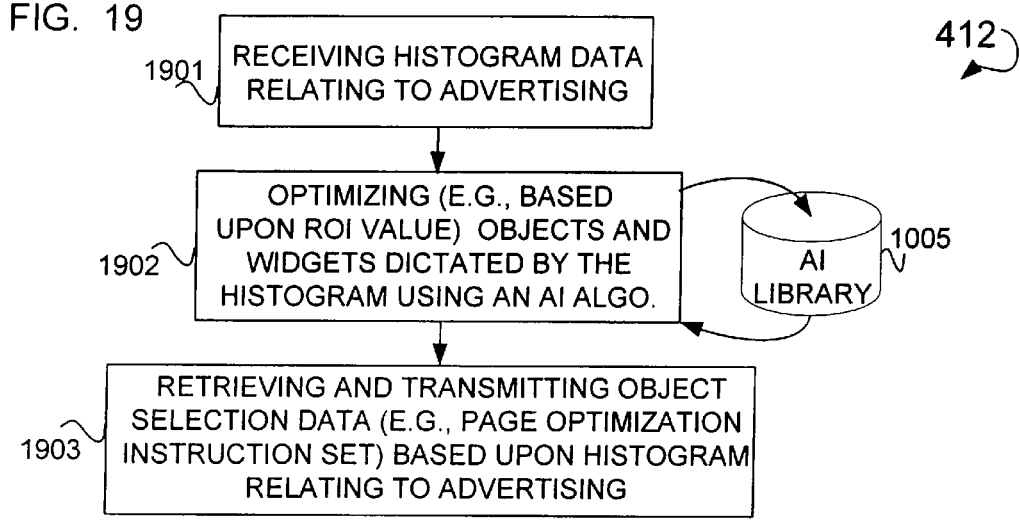
FIG. 19 is a flowchart illustrating a method used to implement an ad module, according to an example embodiment.

FIG. 19 is a flowchart illustrating an example method used to implement module 412. Shown is an operation 1901 that receives a histogram relating to, for example, advertising. Once received, the operation 1902 is executed that optimizes objects associated with the histogram based upon, for example, an ROI value. This optimization occurs through using the previously illustrated AI library 1005 wherein one or more AI algorithms are used to optimize the objects and/or widgets associated with the histogram. Once optimization occurs, an operation 1903 is executed that retrieves and transmits an object selection data or data set regarding which objects are to be used in the optimization, for example, an optimized page 112. In the case of module 412, the histograms typically relates to the optimization of objects or widgets relating to advertising. As previously illustrated, this optimization may involve one or more AI algorithms, but AI algorithms may also be used to, for example, optimize or generate a decision tree that may also be used for the purposes of determining which collection of objects or widgets may provide for the highest ROI value.

Some embodiments may include a method wherein the traffic optimizer module type (e.g., modules 410-414) is selected from the group consisting of page type, merchandising, ad, and navigation modules. Further, in some embodiments, an operation 1901 is implemented for receiving an optimized histogram, an operation 1902 for optimizing object and widget data corresponding to a web page illustrated in the optimized histogram using the one or more AI algorithms, an operation 1903 for retrieving optimized object and widget data, and transmitting the optimized object and widget data as part of a page optimization instruction set. In some embodiments, the transmission is over a network (e.g., an internet) to a presentation module 401.

Figure 20:
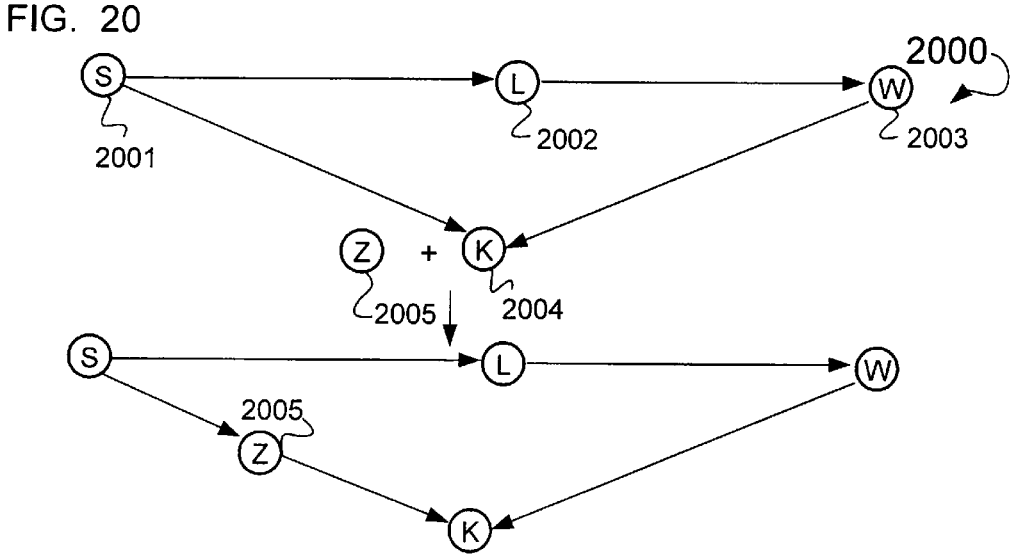
FIG. 20 is a network diagram illustrating a bayesian network that may result from the execution of an operation to optimize object and widgets provided by an ad module, according to an example embodiment.

FIG. 20 is a network diagram illustrating an example bayesian network 2000 that may result from the execution of an operation 1902. This bayesian network may have the following nodes reflecting probability values based upon the data contained in the histograms (e.g., 1303):

"S" 2001 is a probability value of 10% that a JPEG of a princess cut diamond on an optimized web page generated using an ad module 412 may result in a ROI of greater than or equal to $75,000;

"L" 2002 is a probability value of 10% that a JPEG of a round cut diamond on an optimized web page generated using an ad module 412 may result in a ROI of greater than or equal to $75,000;

"W" 2003 is a probability value of 10% that a JPEG of a triangle cut diamond on an optimized web page generated using an ad module 412 may result in a ROI of greater than or equal to $75,000;

"K" 2004 is a probability value of 10% that a Joint Photographic Experts Group (JPEG) photo of an oval cut diamond on an optimized web page generated using an ad module 412 may result in a ROI of greater than or equal to $75,000;

Given the above nodes and associated values, one result of selecting nodes "S" 2001, "L" 2002, "W" 2003, and "K" 2004 (e.g., combining the referenced modules) is that the most likely result may be a 40% chance that an ROI of $75,000 may occur. Assume, however, that new data represented by a node "Z" 2005 is added into the system, wherein "Z" 2005 is a probability value of 20% that by optimizing a web page using the ad module 412, used in combination with the page type module 410, that an ROI of $75,000 may occur. By inserting "Z" 2005 into the path between "S" 2001 and "K" 2004, there then exists a 60% pessimistic probability value that the ROI may be $75,000.

Figures 21, 22:
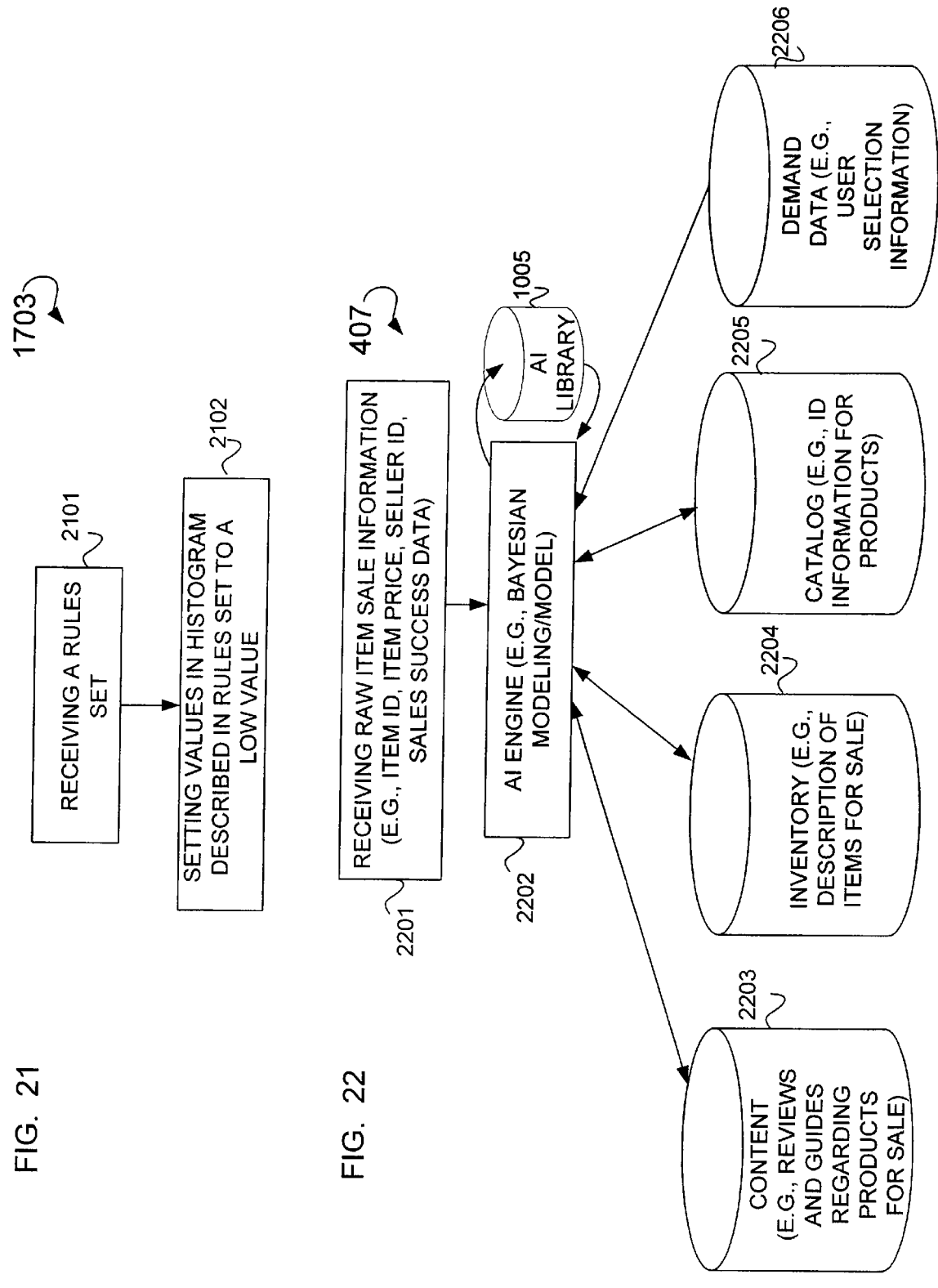
FIG. 21 is a flowchart illustrating a method used to implement an operation to filter various histograms based upon a configuration rule set, according to an example embodiment.
FIG. 22 is a flowchart illustrating a method used to implement a classifier module, according to an example embodiment.

FIG. 21 is a flowchart illustrating an example method used to implement operation 1703. Shown is an operation 2101 that receives a rule set such as, for example, a configuration rule set 416. Once received, an operation 2102 is executed that sets values illustrated in a histogram (e.g., VI, IMP, and BIDS) to low values such that the particular histogram may never be selected for change or modification during the course of implementing operation 1705. In some embodiments, the values in the histogram are set low, whereas, in other embodiments, the values contained in histogram are set very high such that they are never modified because they are considered elite. In still other embodiments, a flag is used to denote objects or widgets that may not be changed and must always be used. One purpose of operation 1703 is to ensure that the configuration rule set 416 is observed by the traffic optimizer engine 409 such that the various rules are contained in the configuration rule set 416 are always adhered to by the traffic optimizer engine 409.

Optimizing Items to be Presented During a User Experience

FIG. 22 is a flowchart illustrating an example method used to implement module 407. Shown is an operation 2201 that receives raw item sales information. For example, received may be an item ID, an item price, seller ID, and/or sales success data. Once received, an operation 2202 is executed that optimizes this item sale information using one or more of the AI algorithms contained in AI library 1005. These items may be optimized based upon such concepts as ROI, or other criteria used to provide the item data to the user via an optimized web page, such as 112. While executing the AI engine 2202, various databases contained in, for example, a search backend 408 may be accessed. These databases include, for example, a database 2203 that contains content, database 2204 that contains inventory information, a database 2205 that contains catalog information, and the database 2206 that contains demand data. These databases may be a part of one database run by one or more database applications. These databases may be based upon relational databases, object relational databases, or OLAP based databases. The data contained within these databases may be modeled as a RDS.

FIG. 23 is a flowchart illustrating an example method used to implement module 408. Shown is an operation 2301 that receives a content request. For example, a content request may be in the form of a search using a keyword. Once received, an operation 2302 is executed that retrieves content based upon that content that is most recommended or predicted by, for example, an AI algorithm. As previously illustrated, this AI algorithm may be retrieved from an AI library 1005. In some cases, one or more AI algorithms may be used in combination (see e.g., a fuzzy genetic algorithm). Once retrieved by an operation 2302, the AI algorithm is then used to determine which content is most recommended wherein this content may be taken from any one of the previously illustrated databases (e.g., 2203-2206). Next, an operation 2303 is executed that transmits this optimized content for inclusion with an optimized web page such as optimized web page 112. The module 408 may, in some cases, be executed using a traffic optimizer engine 409 such that the search backend 408 provides optimized item data in contrast to the demand services backend 406 that provides optimized objects data and/or optimized data relating to which traffic optimizer modules should be used for the purposes of optimizing specific portions of an optimized web page, such as optimized web page 112.

Establishing System Rules

Figures 24, 25:
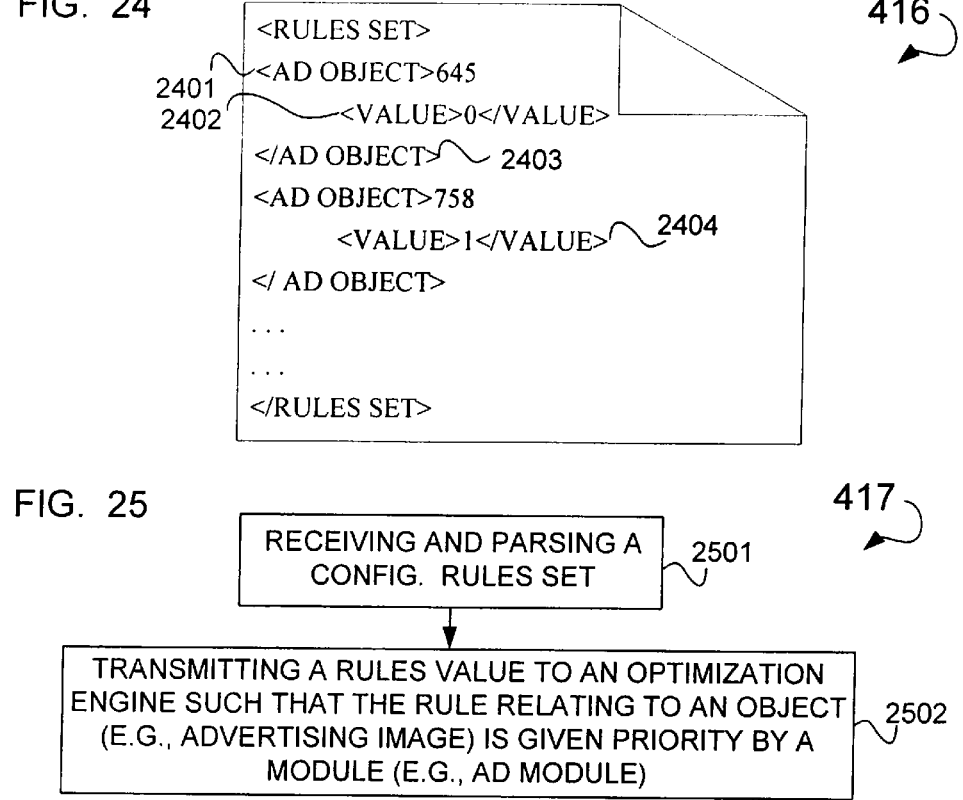
FIG. 24 is a diagram of a configuration rule set, according to an example embodiment.
FIG. 25 is a flowchart illustrating a method used to implement rules engine, according to an example embodiment.

FIG. 24 is a diagram of a configure rule set 416. Shown is a field 2401 that references the identity of a particular ad objects. Further, a field 2402 is illustrated that illustrates the value for this objects. Next, a field 2403 is illustrated that is a closing tag value of the particular objects and its value. Further, a field 2404 is illustrated that contains the value (e.g., 1) of a further ad objects (e.g., 758). In some embodiments, the configure rule set 416 is written using XML, wherein certain tags are generated, such as ad object tags that provide a numerical reference value for a particular object that is based upon, for example, certain contractual relationships between a website and an advertiser cannot be modified and must, for example, be observed in every optimized page, such as 112. As previously illustrated, this inclusion can be denoted by associating a very low value with an object, or in some cases a very high value of the object. Further, in some cases, some other flagging mechanism may be used to denote an object that cannot be modified through, for example, the application of an AI algorithm and hence must be included in every, or in some specific optimized web page.

FIG. 25 is a flowchart illustrating an example method used to implement module 417. Shown is an operation 2501 that receives and parses a configuration rule set such as configuration rule set 416. Once received, an operation 2502 is executed that transmits this rule set with its associated rule values to an optimization engine such that the optimization engine (e.g., traffic optimizer engine 409) gives priority to the particular object. In some cases, this priority may be transmitted by, for example, a traffic optimizer engine 409 to one of the traffic optimizer modules (e.g., 410-414) such that these modules are aware of the fact that the particular object denoted by the configuration rule set 416 must not be optimized and must, for example, always be present in any optimization rule instruction set 604 generated by a particular or corresponding traffic optimizer module (e.g., 410-414).

Some embodiments may include the various databases (e.g., 105, 106, 804, 1003, and 2203-2206) being relational databases, or in some cases On-Line Analytical Processing (OLAP) based databases. In the case of relational databases, various tables of data are created and data is inserted into, and/or selected from, these tables using a Structured Query Language (SQL) or some other database-query language known in the art. In the case of OLAP databases, one or more multi-dimensional cubes or hypercubes containing multidimensional data from which data is selected from or inserted into using MDX may be implemented. In the case of a database using tables and SQL, a database application such as, for example, MySQL™, SQLServer™, Oracle 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Component Design and Distributed Computing Modules

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage tier. These logical/mathematical manipulations may relate to certain business rules, or processes that govern the software application as a whole. A third, storage tier, may be a persistent storage medium or, non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as may be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Component Design

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Market Place Applications

In some embodiments, web pages are optimized such that the business rules governing these pages are dynamic and allow the content on the website to adapt organically (e.g., using AI algorithms such as genetic algorithms) based upon the history of user preferences in the website. For example, rather than having static business rules governing the presentation of content on a site such that the same content (e.g., screen objects or widgets, and the presentation of these objects or widgets via, for example, a CSS) is most always displayed, screen objects and widget may be selected and displayed based upon their ability to satisfy a predetermined ROI value or some other metric for success. These screen objects or widgets may be combined with certain search methods such that an optimized web page may be provided to the user. This web page may change to reflect the ever-changing needs of users, such that rather than having to manually change the business rules implementing a web page, the rules may change automatically or dynamically to reflect current user's preferences. This ability to reflect these preferences may be facilitated through the use of certain AI algorithms used to anticipate user behavior.

A Computer System

The present invention is implemented on a digital processing system or computer system that includes a processor, which may comprise one or more processors and may include one or more conventional types of such processors (e.g., x86, x86-64, ARMx), such as an AMD processor, Intel Pentium or XScale processor, or other suitable processor. A memory is coupled to the processor by a bus. The memory may be a dynamic random access memory (DRAM) and/or may include static RAM (SRAM). The processor may also be coupled to other types of storage areas/memories (e.g., cache, flash memory, disk, etc.), which could be considered as part of the memory or separate from the memory.

In some embodiments, a bus further couples the processor to a display controller, a mass memory or some type of computer-readable medium device, a modem or network interface card or adaptor, and an input/output (I/O) controller. The display controller controls, in a conventional manner, a display, which may represent a Cathode Ray Tube (CRT) display, a Liquid Crystal Display (LCD), a plasma display, or other type of suitable display device. Computer-readable medium may include a mass memory magnetic, optical, magneto-optical, tape, and/or other type of machine-readable medium/device for storing information. For example, the computer-readable medium may represent a hard disk, a read-only or writeable optical CD, etc. In some embodiments, a network adaptor card such as a modem or network interface card is used to exchange data across a network such as an internet. The I/O controller controls I/O device(s), which may include one or more keyboards, mouse/trackball or other pointing devices, magnetic and/or optical disk drives, printers, scanners, digital cameras, microphones, etc.

The present invention may be implemented entirely in executable computer program instructions that are stored on a computer-readable medium or may be implemented in a combination of software and hardware, or in certain embodiments, entirely in hardware.

Embodiments within the scope of the present invention include computer-readable medium for carrying or having computer-executable instructions or data structures stored thereon. Such computer-readable medium may be any available medium which is accessible by a general-purpose or special-purpose computer system. By way of example, and not limitation, such computer-readable medium may comprise physical storage media such as RAM, ROM, EPROM, CD-ROM or other optical-disk storage, magnetic-disk storage or other magnetic-storage devices, or any other media that can be used to carry or store desired program code means in the form of computer-executable instructions, computer-readable instructions, or data structures and that may be accessed by a general-purpose or special-purpose computer system. This physical storage medium may be fixed to the computer system, as in the case of a magnetic drive, or removable, as in the case of an EEPROM device (e.g., flash memory device).

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data that cause a general-purpose computer system or special-purpose computer system to perform a certain function or group of functions. The computer-executable or computer-readable instructions may be, for example, binaries, or intermediate format instructions such as assembly language, or source code.

In this description and in the following claims, a computer system is defined as one or more software modules, one or more hardware modules, or combinations thereof that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or personal digital assistant (PDA)) where internal modules (e.g., a processor and memory) work together to perform operations on electronic data.

Some embodiments may be practiced in network computing environments with many types of computer system configurations, including hubs, routers, wireless access points (APs), wireless stations, personal computers, laptop computers, hand-held devices, multi-processor systems, microprocessor-based or programmable consumer electronics, network PCs, minicomputers, mainframe computers, mobile telephones, PDAs, pagers, or other suitable environment. Some embodiments may be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see above).

Figure 26:
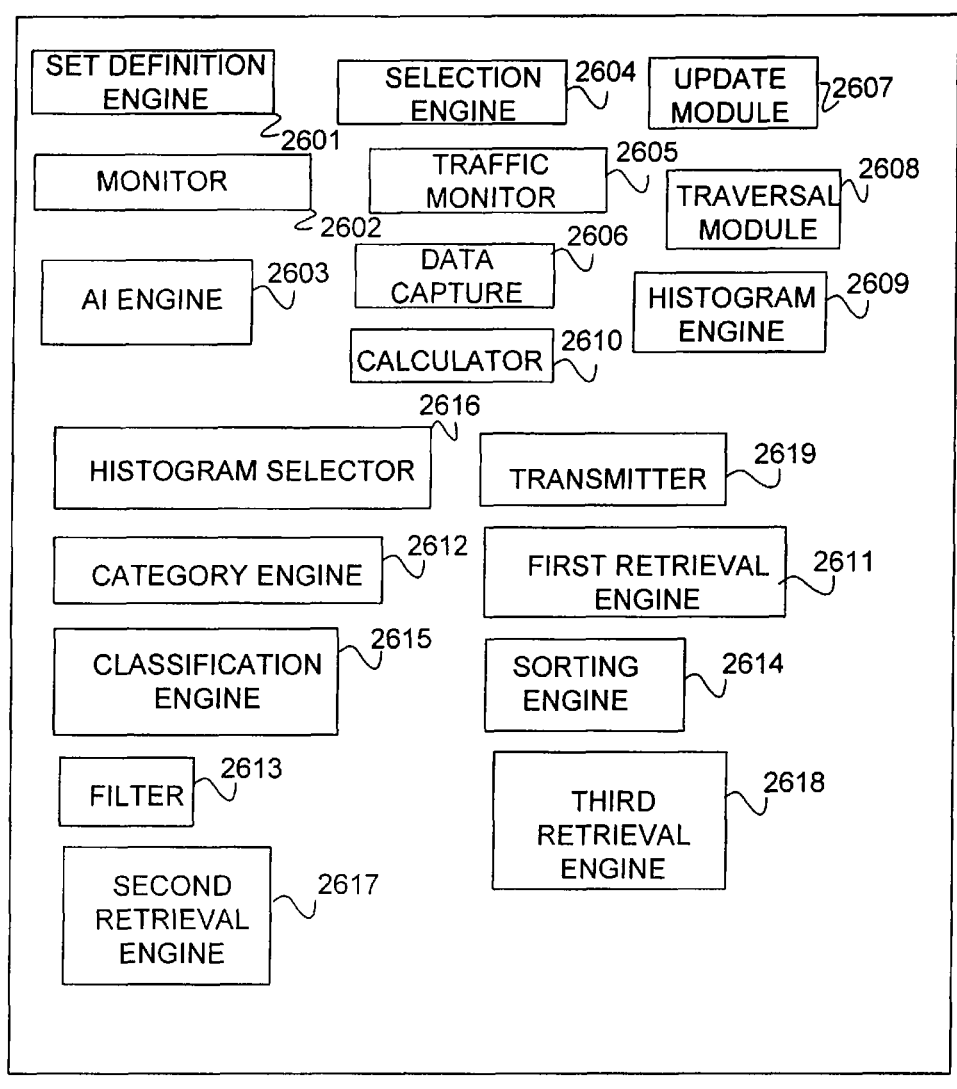
FIG. 26 is a block diagram of a computer system to optimize a web page, according to an example embodiment.

FIG. 26 is a block diagram of an example computer system 2600. Illustrated is a computer system 2600 that includes various modules. These modules may be implemented in hardware, firmware, or even software. Illustrated is a set definition engine 2601 to define a set of perspective objects capable of being placed onto a modified web page. Next, a monitor 2602 is illustrated to monitor parameters of a web page, the parameters including a number of times a current object is executed on the web page. Further, an AI engine 2603 is illustrated that uses an AI algorithm to determine a perspective object with a preferred ROI. Additionally, a selection engine 2604 is shown that selects the perspective object to be placed onto the modified web page. In some cases, the system also includes a traffic monitor 2605 to listen to website traffic, the website traffic including content request data relating to a specific transaction. Next, a data capture 2606 is illustrated that captures the content request data, and to store the content request data. Further, the system may also include an update module 2607 to update a decision tree to reflect recent search queries, the decision tree containing members of a traffic optimizer module set as nodes. Additionally, a traversal module 2608 is shown that facilitates the traversal of the decision tree and a selects a member of the traffic optimizer module set, the selection based upon the member of the traffic optimizer module set with the preferred ROI value. Moreover, a histogram engine 2609 is illustrated to create a histogram relating to keyword usage, the histogram containing a portion of the content request data, and that identifies the member of the traffic optimizer module set. Additionally, a calculator 2610 is illustrated to calculate the preferred ROI based upon a difference between a cost associated with generating the web page, and a revenue amount generated by the web page. This calculator 2610 may also calculate the preferred ROI relative to other possible ROI values resulting from the presentation of the web page.

In some embodiments, the computer system 2600 may additionally include a first retrieval engine 2611 to retrieve a batch of histograms and item types, and a category engine 2612 to categorize each histogram of the batch of histograms based upon the item type, the item type including items to be sold. Next, a filter 2613 is illustrated to filter the batch of histograms using a configuration rules set, the filtering to remove histograms from the batch of histograms that violate a rule in the configuration rules set. Further, a sorting engine 2614 is shown that sorts the batch of histograms. Next, a classification engine 2615 is illustrated that divides the batch of histograms by classification, the classification relating each member of the batch of histograms to one or more members of a traffic optimizer module set. Additionally, a histogram selector 2616 is illustrated that selects a histogram from the batch of histograms, the selecting based upon the histograms relationship to a member of the traffic optimizer module set. In some cases, the one or more members of the traffic optimizer module set includes at least one of a page-type, merchandising, ad, or navigation module. In some cases, a second retrieval engine 2617 is shown to retrieve a histogram from the batch of histograms, and a third retrieval engine 2618 is illustrated that retrieves object data associated with the histogram, the retrieving based upon a preferred ROI value as determined by one or more AI algorithms. Moreover, a transmitter 2619 is illustrated that transmits a object associated with the object data as part of a web page instruction set.

Some embodiments may include one or more computer systems containing the modules outlined in FIG. 26. These modules disclosed in each, may be implemented on one computer system or distributed across multiple computer systems. The computer systems may be configured as multiple applications (e.g., 105), databases, or even web servers (e.g., 104) each executing one or more of these modules. These multiple computer systems may communicate across a network such as network 103.

Figure 27:
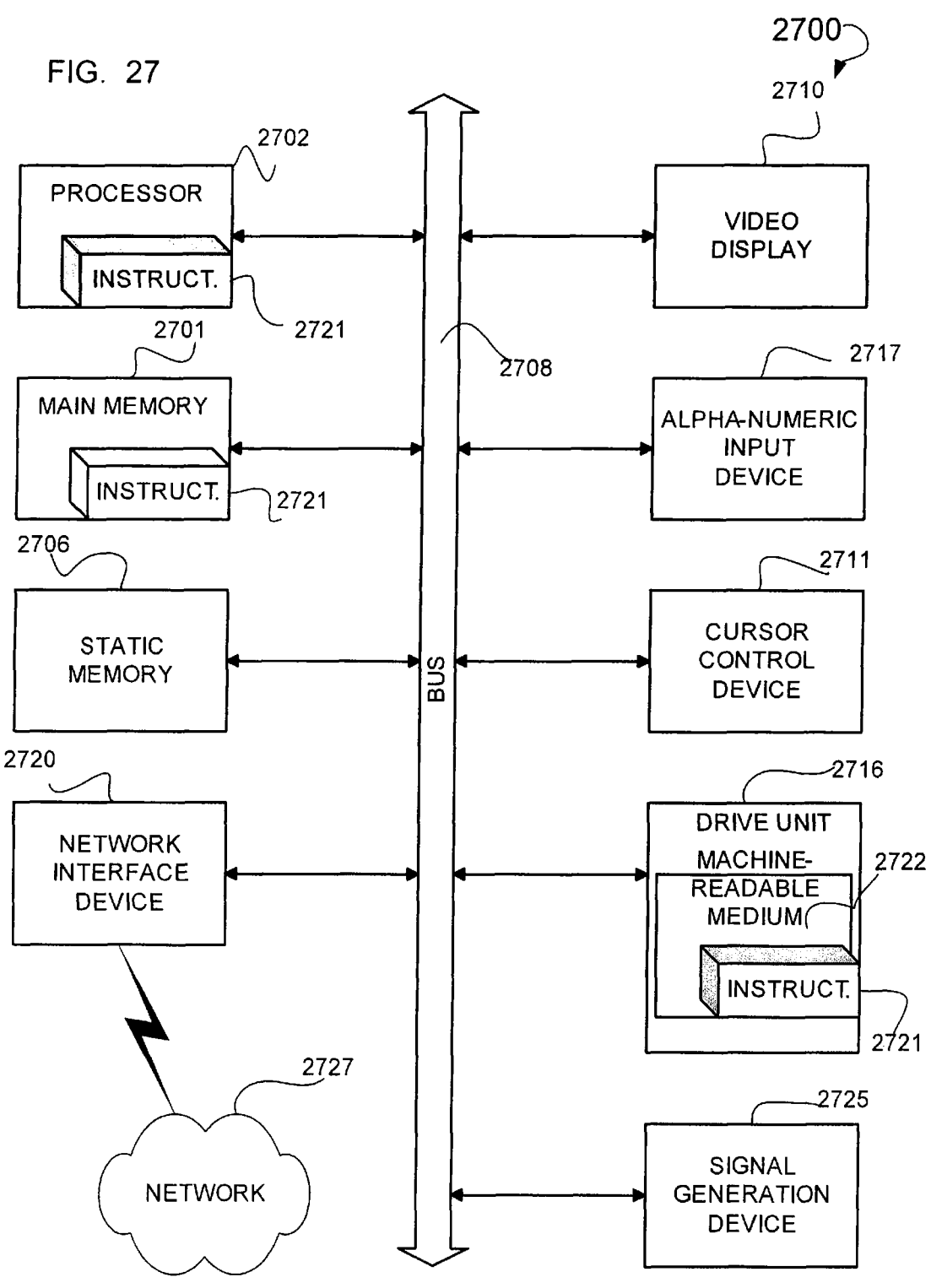
FIG. 27 shows a diagrammatic representation of a machine in the example form of a computer system within which a set of instructions for causing the machine to perform any one or more of the methodologies discussed herein may be executed.

FIG. 27 shows a diagrammatic representation of a machine in the example form of a computer system 2700 within which a set of instructions for causing the machine to perform any one or more of the methodologies discussed herein may be executed. In some embodiments, this computer system 2700 may incorporate the functionality and associated modules illustrated in FIGS. 26 and 27. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see below).

The example computer system 2700 includes a processor 2702 (e.g., a Central Processing Unit (CPU), a Graphics Processing Unit (GPU) or both), a main memory 2701 and a static memory 2706, which communicate with each other via a bus 2708. The computer system 2700 may further include a video display unit 2710 (e.g., a LCD or a CRT). The computer system 2700 also includes an alphanumeric input device 2717 (e.g., a keyboard), a User Interface (UI) cursor controller 2711 (e.g., a mouse), a disk drive unit 2716, a signal generation device 2725 (e.g., a speaker) and a network interface device (e.g., a transmitter) 2720.

The disk drive unit 2716 includes a machine-readable medium 2722 on which is stored one or more sets of instructions and data structures (e.g., software) embodying or used by any one or more of the methodologies or functions illustrated herein. The software may also reside, completely or at least partially, within the main memory 2701 and/or within the processor 2702 during execution thereof by the computer system 2700, the main memory 2701, and the processor 2702 also constituting machine-readable media.

The instructions 2721 may further be transmitted or received over a network 2727 via the network interface device 2720 using any one of a number of well-known transfer protocols (e.g., HTTP or Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more methodologies illustrated herein. The term "machine-readable medium" shall accordingly be taken to include, but not be limited to, solid-state memories, optical and magnetic media, and carrier wave signals.

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. § 1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
a processor; and
a non-transitory computer-readable medium having stored thereon instructions that when executed by the processor cause the system to perform operations comprising:
receiving a request for web page content;
parsing the request for the web page content to generate a new set of parsed content;
updating, based on the new set of parsed content, a hierarchical machine learning model that includes one or more existing sets of parsed content and a plurality of web page machine learning models, wherein the updating includes assigning the new set of parsed content, tracking data indicating user traffic for the new set of parsed content, and a corresponding web page machine learning model to a node in the hierarchical machine learning model;

traversing the updated hierarchical machine learning model based on the received request for the web page content;
selecting, based on the traversing, one or more models of the plurality of web page machine learning models included in the updated hierarchical machine learning model; and
executing the selected one or more models of the plurality of web page machine learning models to generate a customized web page for the requested web page content, wherein the generating includes optimizing the customized web page for user traffic on the requested web page content included in the customized web page.

2. The system of claim 1, wherein the plurality of web page machine learning models are further executable to customize one or more web pages based on one or more requests for web page content such that the customized one or more web pages are optimized for user traffic on the one or more web pages.

3. The system of claim 1, wherein updating the hierarchical machine learning model includes adding the new set of parsed content and a corresponding web page machine learning model to the hierarchical machine learning model, and wherein adding the new set of parsed content incorporates a new set of search queries that correspond to the new set of parsed content into the hierarchical machine learning model.

4. The system of claim 1, wherein the hierarchical machine learning model is a decision tree.

5. The system of claim 4, wherein updating the decision tree includes:
identifying, based on the new set of parsed content, one of the plurality of web page machine learning models; and
assigning the new set of parsed content and the identified web page machine learning model to a node of the decision tree.

6. The system of claim 5, wherein nodes of the decision tree are organized such that a shortest path to a highest return on investment (ROI) value is generated.

7. The system of claim 1, wherein updating the hierarchical machine learning model includes adding tracking data associated with at least one of selections or search queries performed on an existing web page.

8. The system of claim 1, wherein the instructions are further executable by the processor to cause the system to perform operations comprising:
querying a web page content database to retrieve one or more web page objects stored in the web page content database; and
inputting one or more of the web page objects retrieved from the web page content database during the querying into respective ones of the plurality of web page machine learning models.

9. The system of claim 1, wherein the operations further comprise:
storing the updated hierarchical machine learning model in a hierarchical data store for subsequent use.

10. A non-transitory computer-readable medium having instructions stored thereon that when executed cause a computing device to perform operations comprising:
receiving a request for web page content;
parsing the request for the web page content to generate a new set of parsed content;
updating, based on the new set of parsed content, a hierarchical machine learning model that includes one or more existing sets of parsed content and a plurality of web page machine learning models, wherein the updating includes assigning the new set of parsed content, tracking data indicating user traffic for the new set of parsed content, and a corresponding web page machine learning model to a node in the hierarchical machine learning model;

traversing the updated hierarchical machine learning model based on the received request for the web page content;

selecting, based on the traversing, one or more models of the plurality of web page machine learning models included in the updated hierarchical machine learning model; and executing the selected one or more models of the plurality of web page machine learning models to generate a customized web page for the requested web page content, wherein the generating includes optimizing the customized web page for user traffic on the requested web page content included in the customized web page.

11. The non-transitory computer-readable medium of claim 10, wherein updating the hierarchical machine learning model includes adding the new set of parsed content and a corresponding web page machine learning model to the hierarchical machine learning model, and wherein adding the new set of parsed content incorporates a new set of search queries that correspond to the new set of parsed content into the hierarchical machine learning model.

12. The non-transitory computer-readable medium of claim 10, wherein updating the hierarchical machine learning model includes adding tracking data relating to at least one of selections or search queries performed on a web page.

13. The non-transitory computer-readable medium of claim 10, wherein the hierarchical machine learning model is a decision tree, and wherein updating the decision tree includes:

identifying, based on the new set of parsed content, one of the plurality of web page machine learning models; and assigning the new set of parsed content and the identified web page machine learning model to a node of the decision tree.

14. The non-transitory computer-readable medium of claim 10, wherein the operations further comprise:

querying a web page content database to retrieve one or more web page objects stored in the web page content database; and inputting one or more of the web page objects retrieved from the web page content database during the querying into respective ones of the plurality of web page machine learning models.

15. The non-transitory computer-readable medium of claim 10, wherein at least one of the plurality of web page machine learning models is a deterministic algorithm.

16. A method, comprising:

receiving, by a computer system, a request for web page content;

parsing, by the computer system, the request for the web page content to generate a new set of parsed content;

updating, by the computer system based on the new set of parsed content, a hierarchical machine learning model that includes one or more existing sets of parsed content and a plurality of web page machine learning models, wherein the updating includes assigning the new set of parsed content, tracking data indicating user traffic for the new set of parsed content, and a corresponding web page machine learning model to a node in the hierarchical machine learning model;

traversing, by the computer system, the updated hierarchical machine learning model based on the received request for the web page content;

selecting, by the computer system based on the traversing, one or more models of the plurality of web page machine learning models included in the updated hierarchical machine learning model; and executing, by the computer system, the selected one or more models of the plurality of web page machine learning models to generate a customized web page for the requested web page content, wherein the generating includes optimizing the customized web page for user traffic on the requested web page content included in the customized web page.

17. The method of claim 16, wherein the plurality of web page machine learning models are further executable to customize one or more web pages based on one or more requests for web page content such that the customized one or more web pages are optimized for user traffic on the one or more web pages.

18. The method of claim 16, wherein updating the hierarchical machine learning model includes adding the new set of parsed content and a corresponding web page machine learning model to the hierarchical machine learning model, and wherein adding the new set of parsed content incorporates a new set of search queries that correspond to the new set of parsed content into the hierarchical machine learning model.

19. The method of claim 16, wherein the hierarchical machine learning model is a decision tree.

20. The method of claim 19, wherein updating the decision tree includes:

identifying, based on the new set of parsed content, one of the plurality of web page machine learning models; and assigning the new set of parsed content and the identified web page machine learning model to a node of the decision tree.

* * * * *